US011961334B2

(12) United States Patent
Thomas et al.

(10) Patent No.: US 11,961,334 B2
(45) Date of Patent: Apr. 16, 2024

(54) BIOMETRIC DATA STORAGE USING FEATURE VECTORS AND ASSOCIATED GLOBAL UNIQUE IDENTIFIER

(71) Applicant: Microsoft Technology Licensing, LLC, Redmond, WA (US)

(72) Inventors: William Louis Thomas, Redmond, WA (US); Jinyu Li, Sammamish, WA (US); Yang Chen, Bellevue, WA (US); Youyou Han Oppenlander, Bothell, WA (US); Steven John Bowles, Kenmore, WA (US); Qingfen Lin, Redmond, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 283 days.

(21) Appl. No.: 17/331,574

(22) Filed: May 26, 2021

(65) Prior Publication Data
US 2022/0335249 A1 Oct. 20, 2022

Related U.S. Application Data

(60) Provisional application No. 63/176,310, filed on Apr. 18, 2021.

(51) Int. Cl.
*G06K 9/36* (2006.01)
*G06F 16/28* (2019.01)
(Continued)

(52) U.S. Cl.
CPC .......... *G06V 40/50* (2022.01); *G06F 16/285* (2019.01); *G06V 10/751* (2022.01); *G06V 40/168* (2022.01); *G06V 40/172* (2022.01)

(58) Field of Classification Search
CPC ............... G06V 40/50; G06V 40/172–40/173
See application file for complete search history.

(56) References Cited

U.S. PATENT DOCUMENTS 6,119,096 A * 9/2000 Mann ..................... G06Q 10/02
705/40
9,953,149 B2 * 4/2018 Tussy ................... G06V 40/166
(Continued)

OTHER PUBLICATIONS

"International Search Report and Written Opinion Issued in PCT Application No. PCT/US2022/017856", dated Jun. 1, 2022, 16 Pages.

(Continued)

*Primary Examiner* — Brian Werner
(74) *Attorney, Agent, or Firm* — Foley IP Law, PLLC

(57) ABSTRACT

The disclosure herein describes systems and methods for object data storage. In some examples, the method includes generating a profile for an object in a directory, the profile including a first feature vector corresponding to the object and a global unique identifier (GUID) corresponding to the first feature vector in the profile; generating a search scope, the search scope including at least the GUID corresponding to the profile; generating a second feature vector from a live image scan; matching the generated second feature vector from the live image scan to the first feature vector using the generated search scope; identifying the GUID corresponding to the first feature vector that matches the second feature vector; and outputting information corresponding to the object of the profile identified by the GUID corresponding to the first feature vector.

16 Claims, 14 Drawing Sheets

(51) Int. Cl.
*G06K 9/62* (2022.01)
*G06V 10/75* (2022.01)
*G06V 40/16* (2022.01)
*G06V 40/50* (2022.01)

(56) References Cited

U.S. PATENT DOCUMENTS

| | | | |
|---|---|---|---|
| 2007/0206839 A1* | 9/2007 | Hanna | G06F 16/24 382/117 |
| 2008/0123907 A1 | 5/2008 | Eura et al. | |
| 2011/0058743 A1 | 3/2011 | Myers et al. | |
| 2012/0288165 A1* | 11/2012 | Bedros | G06V 10/993 382/118 |
| 2017/0300744 A1 | 10/2017 | Ju et al. | |
| 2018/0101742 A1* | 4/2018 | Burge | G06F 16/5838 |
| 2019/0034747 A1* | 1/2019 | Lupowitz | G06V 40/1365 |
| 2020/0143148 A1* | 5/2020 | Sobh | G06V 10/95 |

OTHER PUBLICATIONS

Tang, et al., "Load Balancing for Partition-Based Similarity Search", In Proceedings of the 37th International ACM SIGIR Conference on Research & Development in Information Retrieval, Jul. 6, 2014, pp. 193-202.

"Face—Detect", Retrieved from: https://westus.dev.cognitive.microsoft.com/docs/services/563879b61984550e40cbbe8d/operations/563879b61984550f30395236, Retrieved Date: Nov. 1, 2022, 9 Pages.

"Large Face list—Create", Retrieved from: https://westus.dev.cognitive.microsoft.com/docs/services/563879b61984550e40cbbe8d/operations/5a157b68d2de3616c086f2cc, Retrieved Date: Nov. 1, 2022, 6 Pages.

"Large Person Group—Create", Retrieved from: https://westus.dev.cognitive.microsoft.com/docs/services/563879b61984550e40cbbe8d/operations/599acdee6ac60f11b48b5a9d, Retrieved Date: Nov. 1, 2022, 5 Pages.

"Person Group Person—Create", Retrieved from: https://westus.dev.cognitive.microsoft.com/docs/services/563879b61984550e40cbbe8d/operations/563879b61984550f3039523c, Retrieved Date: Nov. 1, 2022, 6 Pages.

"LargePersonGroupPerson—Add Face", Retrieved from: https://westus.dev.cognitive.microsoft.com/docs/services/563879b61984550e40cbbe8d/operations/599adf2a3a7b9412a4d53f42, Retrieved Date: Nov. 1, 2022, 6 Pages.

"Large Person Group Person—Create", Retrieved from: https://westus.dev.cognitive.microsoft.com/docs/services/563879b61984550e40cbbe8d/operations/599adcba3a7b9412a4d53f40, Retrieved Date: Nov. 1, 2022, 5 Pages.

"Microsoft REST API Guidelines", Retrieved from: https://github.com/microsoft/api-guidelines/blob/vNext/Guidelines.md, Retrieved Date: Nov. 1, 2022, 74 Pages.

"Person Group—Create", Retrieved From: https://westus.dev.cognitive.microsoft.com/docs/services/563879b61984550e40cbbe8d/operations/563879b61984550f30395244, Retrieved Date: Nov. 1, 2022, 5 Pages.

* cited by examiner

BIOMETRIC DATA STORAGE USING FEATURE VECTORS AND ASSOCIATED GLOBAL UNIQUE IDENTIFIER

CROSS-REFERENCE TO RELATED APPLICATION

This application claims priority to U.S. Patent Provisional Application No. 63/176,310, entitled "OBJECT DATA STORAGE," filed on Apr. 18, 2021, the disclosure of which is incorporated herein by reference in its entirety.

BACKGROUND

Conventional methods of object recognition, including facial recognition, include creating a group, assigning and storing image data for the group, training the system to learn the image data, and cross-referencing new object images against the stored image data. The conventional method presents several challenges. First, due to the requirements of training the data to accurately cross reference new object images against stored image data, the conventional methods require significant time to execute and are therefore insufficient for real-time applications. Second, the conventional methods fail to sufficiently enable the creation of new groups and/or updating of a current group. For example, adding an object to a second group requires an entirely new profile for the object to be generated and image data to be re-uploaded.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized system and method for object data storage. In some examples, the method includes generating a profile for an object in a directory, the profile including a first feature vector corresponding to the object and a global unique identifier (GUID) corresponding to the first feature vector in the profile; generating a search scope, the search scope including at least the GUID corresponding to the profile; generating a second feature vector from a live image scan; matching the generated second feature vector from the live image scan to the first feature vector using the generated search scope; identifying the GUID corresponding to the first feature vector that matches the second feature vector; and outputting information corresponding to the object of the profile identified by the GUID corresponding to the first feature vector.

Other examples provide a system for object data storage. The system includes a processor and a computer-readable medium storing instructions that are operative, upon execution by the processor, to cause the processor to generate a profile for an object in a directory, the profile including a first feature vector corresponding to the object and a global unique identifier (GUID) corresponding to the first feature vector in the profile, generate a search scope, the search scope including at least the GUID corresponding to the profile, generate a second feature vector from a live image scan, match the generated second feature vector from the live image scan to the first feature vector using the generated search scope, identify the GUID corresponding to the first feature vector that matches the second feature vector, and output information corresponding to the object of the profile identified by the GUID corresponding to the first feature vector.

Still other examples provide a method for retrieving a stored object profile. The method includes receiving, from an electronic device, a live image scan; generating a feature vector from the live image scan; tagging the generated feature vector with a global unique identifier (GUID); identifying a search scope within a directory, the search scope including a plurality of partitions within the directory, wherein the directory includes a profile of an object that includes information corresponding to the object and a stored GUID corresponding to the profile; searching, in parallel, each partition of the plurality of partitions for the stored GUID corresponding to the tagged GUID; and identifying the profile corresponding to the tagged GUID.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1-11 the systems are illustrated as schematic drawings. The drawings may not be to scale.

DETAILED DESCRIPTION

Figure 1:
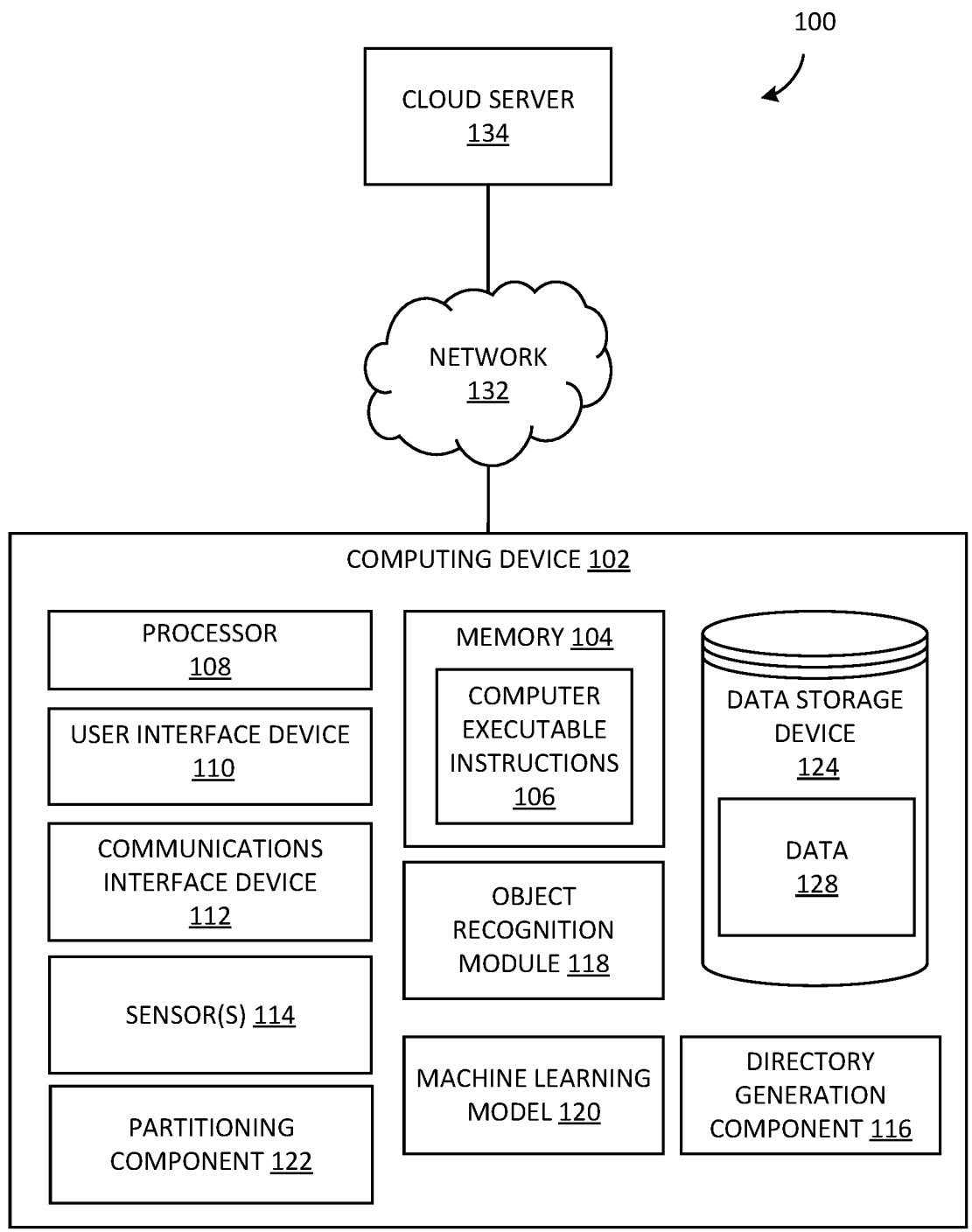
FIG. 1 is a block diagram illustrating a system for object data storage according to examples of the present disclosure.

Aspects of the disclosure provide object data storage that stores image data in an elastic directory that enables real-time, or near real-time, object recognition identification. By storing image data in the elastic directory, the step of training data that conventional methods of object recognition require is eliminated. Furthermore, virtually unlimited storage is provided by enabling horizontal scaling to meet a desired load while returning identification results within seconds. The elastic directory further enables profiles of objects from the directory to be selected to search against without requiring training or reenrollment of objects into the search group. In other words, a database of profiles of objects can be maintained to search against but only a subset of the objects is searched against at a time.

In one particular example, the disclosure is implemented such that the object is an individual and the image data is facial data. For example, biometric storage stores facial data in an elastic directory that enables real-time, or near real-time, facial recognition identification. By storing facial image data in the elastic directory, the step of training data that conventional methods of facial recognition require is eliminated. Furthermore, virtually unlimited storage is provided by enabling horizontal scaling to meet a desired load while returning identification results within seconds. The elastic directory further enables profiles of individuals from the directory to be selected to search against without requiring training or reenrollment of persons into the search group. In other words, a database of profiles of individuals can be maintained to search against but only a subset of the objects is searched against at a time.

As noted above, current solutions may utilize the concept of an object, but these concepts are limited in functionality. For example, rather than a true object, current solutions essentially provide a container for uploading multiple images and calculating an average image feature vector. The data within the container, such as image data, cannot be referenced or copied between groups. Accordingly, a new group is required to upgrade the group or upgrade to a new recognition model, and a training model is required to be called to reflect new changes to the group. Further, identification calls may be blocked while the training is occurring.

In existing solutions, the concept of an object is limited to a single group and cannot be shared across groups. Furthermore, groups are typed. This presents several challenges, as it would be advantageous for objects to not exist only inside of one group, for groups to not have to be typed, and for creation of a group to not require the original image of the object. Accordingly, examples of the present disclosure provide centralized profiles of objects in a storage layer, enable groups to reference particular profiles, and enable the removal of typed groups.

Additionally, in existing solutions, a training model, i.e., Train( ) must be called on large groups. For example, for facial recognition, Train( ) is called for large person groups to compute an average face for newly added faces and reflect changes to production, while blocking the identify call. This prevents challenges, as Train should not be required at all and, alternatively, should not block identification calls. Accordingly, examples of the present disclosure enable an average image to be computed at the time the image is added, removes Train( ) altogether and replaces with eventual consistency, and prevents identification calls from being blocked.

Additionally, in existing solutions, scalability is limited to one million objects, or profiles, in a large object group. This prevents challenges because some directories include more than one million profiles and can be as large as twenty million or greater. In some instances, directories are created of images of objects that should be blocked, for example faces of individuals that should be blocked from utilizing a product or service. Accordingly, examples of the present disclosure provide partitions within the generated directory to speed up identification, which enables parallelized identification calls. This addresses the scale limitations of current solutions by enhancing the scalability of the image recognition, such as facial recognition, and data storage, such as biometric storage, described in examples of the present disclosure.

Accordingly, the system provided in the present disclosure operates in an unconventional manner by organizing objects into smaller partitions within a flat list of profiles of enrolled individuals so that identification is a map-reduce operation that allows performance targets to be maintained. For example, in facial recognition implementations, individuals can enroll in the system of the present disclosure. The persons are organized into smaller partitions within a flat list of profiles of enrolled individuals so that identification is a map-reduce operation that allows performance targets to be maintained. The enroll and identification process tracks the size of each partition, the amount of delta additions and deletions from each partition, and repartitions when partitions grow too large, or deltas of those partitions grow too large. When repartitioning is performed, one hundred percent of uptime for identification and one hundred percent of uptime for management calls to add/remove objects/images, such as persons/faces, are maintained, all without compromising performance. The design of the directory of profiles revolves around recognizing an object, such as a person, and supports binding multiple recognition models to the same underlying object. The present disclosure enables multiple images, such as from different angles, of an object to be uploaded and calculate the best feature to possibly identify that object per model. The present disclosure further removes the need to create a new object directory every time a new recognition model version is released.

Accordingly, one aspect of the present disclosure enables the redesign of the storage of a profile of an enrolled object with centralized feature vectors inside of an image API instance. For example, the enrolled object can be an individual and the centralized feature vectors can be inside of a face API instance. A global unique identifier (GUID) is assigned to the profile of individual and used throughout the face API instance. The GUID supports all existing and future recognition models. As described herein, no explicit training is required while a three-second or less identification performance service level agreement (SLA) is maintained.

FIG. 1 is a block diagram illustrating a system for object data storage according to an example. The system 100 illustrated in FIG. 1 is provided for illustration only. Other examples of the system 100 can be used without departing from the scope of the present disclosure.

The system 100 includes a computing device 102, a network 132, and a cloud server 134. The computing device 102 represents any device executing computer-executable instructions 106 (e.g., as application programs, operating system functionality, or both) to implement the operations and functionality associated with the computing device 102. The computing device 102 in some examples includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 includes at least one processor 108, a memory 104 that includes the computer-executable instructions 106, and a user interface device 110. The processor 108 includes any quantity of processing units and is programmed to execute the computer-executable instructions 106. The computer-executable instructions 106 are performed by the processor 108, performed by multiple processors within the computing device 102, or performed by a processor external to the computing device 102. In some examples, the processor 108 is programmed to execute computer-executable instructions 106 such as those illustrated in the figures described herein, such as FIGS. 2-11. In various examples, the processor 108 is configured to execute one or more of the sensor(s) 114, the partitioning component 122, the object recognition module 118, the machine learning model 120, and the directory generation component 116.

The memory 104 includes any quantity of media associated with or accessible by the computing device 102. The memory 104 in these examples is internal to the computing device 102, as illustrated in FIG. 1. In other examples, the memory 104 is external to the computing device 102 or both internal and external to the computing device 102. For example, the memory 104 can include both a memory component internal to the computing device 102 and a memory component external to the computing device 102. The memory 104 stores data, such as one or more applications. The applications, when executed by the processor 108, operate to perform various functions on the computing device 102. The applications can communicate with counterpart applications or services, such as web services accessible via the network 132. In an example, the applications represent downloaded client-side applications that correspond to server-side services executing in a cloud, such as the cloud server 134.

The user interface device 110 includes a graphics card for displaying data to a user and receiving data from the user. The user interface device 110 can also include computer-executable instructions, for example a driver, for operating the graphics card. Further, the user interface device 110 can include a display, for example a touch screen display or natural user interface, and/or computer-executable instructions, for example a driver, for operating the display. The user interface device 110 can also include one or more of the following to provide data to the user or receive data from the user: speakers, a sound card, a camera, a microphone, a vibration motor, one or more accelerometers, a BLU-ETOOTH® brand communication module, global positioning system (GPS) hardware, and a photoreceptive light sensor. In a non-limiting example, the user inputs commands or manipulates data by moving the computing device 102 in one or more ways.

The computing device 102 further includes a communications interface device 112. The communications interface device 112 includes a network interface card and/or computer-executable instructions, such as a driver, for operating the network interface card. Communication between the computing device 102 and other devices, such as but not limited to the cloud server 134, can occur using any protocol or mechanism over any wired or wireless connection. In some examples, the communications interface device 112 is operable with short range communication technologies such as by using near-field communication (NFC) tags.

The computing device 102 further includes a data storage device 124 for storing data, such as, but not limited to data 128. The data 128 can be the directory of profiles generated by the directory generation component 116. The data storage device 124 in some non-limiting examples includes a redundant array of independent disks (RAID) array.

The data storage device 124, in this example, is included within the computing device 102, attached to the computing device 102, plugged into the computing device 102, or otherwise associated with the computing device 102. In other examples, the data storage device 126 includes a remote data storage accessed by the computing device 102 via the network 132, such as a remote data storage device, a data storage in a remote data center, or a cloud storage.

The computing device 102 includes one or more sensors 114 configured to capture image data. In some examples, the captured image data is facial image data of the face of an individual. The one or more sensors 114 can include one or cameras, such as a red, green, blue (RGB) camera, an infrared (IR) camera, and so forth. The computing device 102 further includes a directory generation component 116 configured to generate a directory of profiles. Each of the profiles in the directory include a feature vector that is an average of image data scans, such as a live image scan, and a global unique identifier (GUID) corresponding to the profile. For example, where the system 100 is implemented for biometric storage of facial data, each of the profiles in the directory include a feature vector that is an average of live image scans, such as live facial scans in the biometric storage example, and the GUID corresponding to the profile. The computing device 102 further includes a partitioning component 122 configured to partition the directory generated by the directory generation component 116 into partitions, further described in greater detail below, that can be searched in parallel to recognize a GUID in the directory that corresponds to the live image scan obtained by the one or more sensors 114. The computing device 102 further includes an object recognition module 118 that recognizes an object in the obtained live image scan and generates the feature vector. In examples where the system 100 is implemented for facial recognition, the object recognition module 118 is implemented as a facial recognition module that recognizes a face in data of the live image scan and generates the feature vector. The computing device 102 further includes a machine learning model 120 to optimize the parallelized searching of the partitions.

Figure 2:
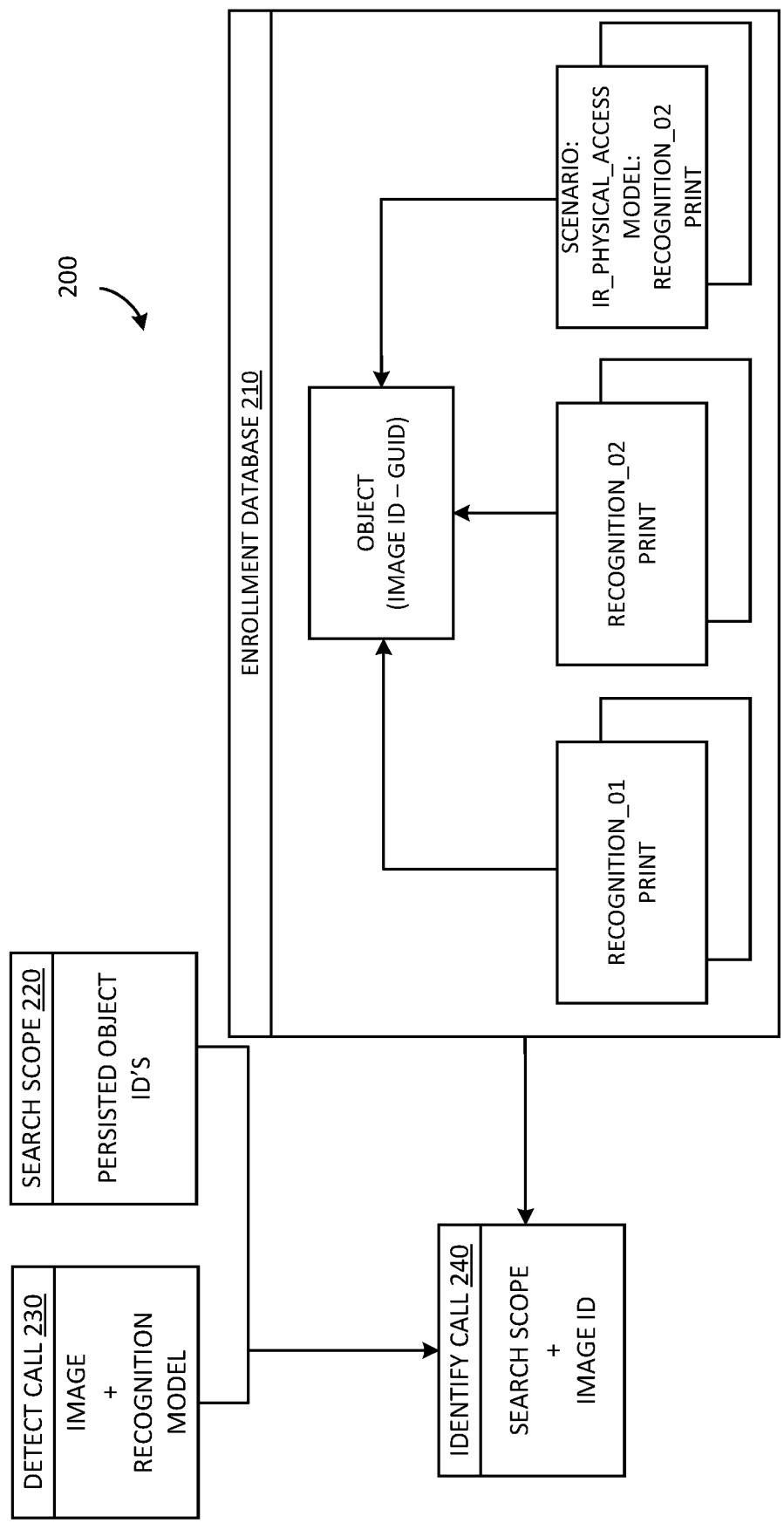
FIG. 2 is a block diagram illustrating a centralized enrollment data flow according to examples of the present disclosure.

FIG. 2 is a block diagram illustrating a centralized enrollment data flow according to examples of the present disclosure. The block diagram 200 of FIG. 2 is for illustration only and should not be construed as limiting. Various examples of the block diagram can be used without departing from the scope of the present disclosure.

An enrollment database 210 is generated that stores a profile for each object. In some examples, the enrollment database 210 is a directory that includes the profile for each object. In the enrollment database 210, one or more images, such as Recognition_01 feature vector and Recognition_02 feature vector, are analyzed to generate a feature vector for the object that is input to a file for the profile of the object in the directory. The feature vector is an average of all results of image data and is specific to each individual. In some examples, the images are captured using a live image scan. The particular scenario is stored in the file for the profile of the object in the directory, such as IR_Physical_Access indicating how each feature vector was captured. Using the feature vector data and scenario data, the object is assigned a GUID. The GUID is a pointer, or tag, that points to the particular listing, i.e., the profile, of the object in the directory. In some examples, the GUID is an identification code including a combination of numerals and alphanumeric letters. For example, each location of the GUID includes either an alphanumeric letter A-F or a numeral 0-9. An example GUID can be "1d44651f-fadb-41f5-8918-c30609964489", "c1d3b745-2548-4abf-b057-a386c9bd52f1", and so forth.

In some examples, the enrollment database 210 stores a profile for each individual that has opted in to enrollment. The enrollment database 210 includes a profile for each individual. One or more images, such as Recognition_01 face feature vector and Recognition_02 face feature vector, are analyzed to generate a face feature vector for the individual that is input to a file for the profile of the individual in the directory.

A search scope 220 is generated that defines a specific group of profiles. In some examples, the search scope 220 is referred to as a dynamic group. The search scope 220 is a container that defines a specific group of objects, whose profile is stored in the directory by including the persisted object ID of each object to be included in the search scope 220. In some examples, the persisted object ID of each object is a GUID. In some examples, the GUID corresponding to the object is included in multiple search scopes 220. For example, the computerized method of FIG. 2 can be implemented in an airport for facial recognition. In this example, the GUID for a single individual is included in a first search scope for a security checkpoint and a second search scope for a particular flight. The first search scope for a security checkpoint can include all profiles of individuals who have purchased tickets for flights on a particular day and the second search scope for the particular flight includes only the profiles of individuals who purchased a ticket for the particular flight indicated by the second search scope. The search scope 220 is updated to add or remove profiles of individuals into the search space. The search scope 220 and user data are stored until the search scope is deleted. In some examples, the search scope 220 is stored until manually deleted. In other examples, the search scope 220 is stored for a period of time, such as one day, one week, one month, and so forth, and deleted when the period of time is met.

A detect call 230 is received that includes image data and a recognition model. In some examples, the image data is a facial image to be recognized. In some examples, the recognition model refers to a particular model that is used to recognize the object. The recognition model can include scenario data that refers to which quality filter is applied, such as red, green, blue (RGB), infrared (IR), and so forth. In other words, the detect call 230 is associated with a particular recognition model that provides a feature vector of the image data.

An identify call 240 is provided that includes the search scope and feature vector of the image data from the detect call. In other words, the identify call identifies the feature vector of the image data and the scope within which the feature vector is to be searched. In the example above, the search scope can be the second search scope identifying a list of passengers who have purchased a ticket for a particular flight and the feature vector of the facial image data is a feature vector of an individual attempting to board the particular flight. The identify call loads the face feature vectors from the directory that match the search scope 220 and compares the feature vector from the detect call to each of the GUIDs that are pulled from the directory and included in the search scope. Examples of the present disclosure enable parallelized comparisons where multiple objects are identified independently as part of the same request, for example multiple live image scans, such as live facial scans in biometric examples, that are received at or around the same time.

A potential match between the feature vector for the live data and the feature vectors of the GUIDs is identified by computing similarities between the feature vector for the live data and the feature vectors of each GUID included in the search scope 220. A candidate object, or candidate objects, corresponding to the identified GUID is pulled and the information from the original raw data stored in the directory is returned ranked by similarity confidence. When a potential match for the feature vector for the image data is identified, data corresponding to the profile of the matching object in the directory is provided with a confidence level for the match. For example, using the example above, the feature vector corresponding to the image data for the passenger is compared to the feature vectors of the GUIDs in the search scope 220, a potential match is identified, and the name and seat information for the potential match is provided with a confidence level of the match. In some examples, the computerized method includes a verification to verify whether two images belong to the same object or to two different objects.

In some examples, the number of candidate objects is limited or restricted by a predetermined maximum number of candidates returned and a confidence threshold. For example, the predetermined maximum number of candidates returned limits the number of candidates that is returned. Accordingly, only the number of candidates within the limits that have the highest confidence level are returned. The confidence threshold specifies a minimum confidence of a match required to return the result as a potential candidate. In some examples, a potential candidate is not identified in the search scope 220. In these examples, an empty array is returned along with an error message indicating no potential candidates were identified.

Figure 3:
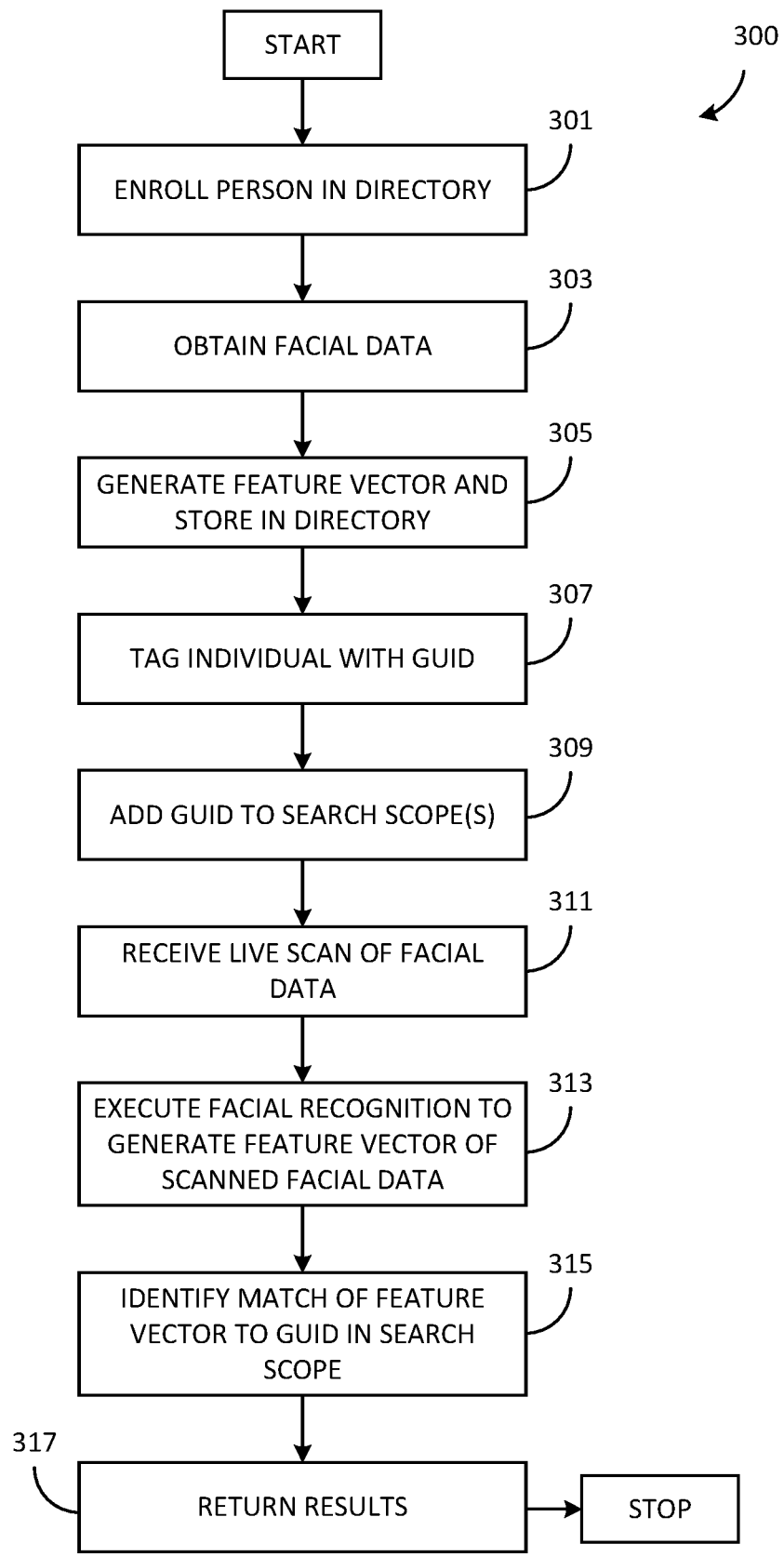
FIG. 3 is a computerized method of storing and returning biometric data according to examples of the present disclosure.

FIG. 3 is a computerized method of storing and returning biometric data according to examples of the present disclosure. Various examples of the computerized method 300 can be used without departing from the scope of the present disclosure.

It should be appreciated that the example method 300 presented in FIG. 3 is intended for illustration only and should not be construed as limiting. In other words, although FIG. 3 illustrates the present disclosure implemented in a facial recognition system that stores and returns biometric data, the present disclosure can be implemented in any suitable type of object recognition system that stores and returns object data as described herein. The computerized method 300 is implemented by one or more components described herein, such as the computing device 102.

The computerized method 300 begins by enrolling an individual in a directory in operation 301 via the directory generation component 116. The capacity of the directory is virtually unlimited. For example, seventy-five million+identities can be stored in the directory, but this number is only limited by pricing models. In actuality, the limit is boundless as the directory is engineered in a way that can horizontally scale out to meet desired load while returning identification results within seconds. In operation 303, facial image data is obtained. In some examples, the facial image data is obtained via a live facial scan by a camera. The camera can be any camera suitable for capturing facial image data, such as an RGB camera, an IR camera, and so forth.

In operation 305, a feature vector is generated of the captured facial image data via the object recognition module 118 and stored in the directory. Storing the feature vector in the directory with information for the individual, such as a name, contact information, and so forth, enables the profile of the individual to be identified later using facial recognition without the facial image data itself being stored in the directory. In other words, the facial image data can be discarded after the feature vector is generated and stored. Accordingly, storage needs are decreased because the original image data is no longer needed and can be discarded, and security is enhanced because less data is maintained for each individual.

In operation 307, the profile of the individual in the directory is tagged with a GUID via the partitioning component 122. In some examples, the GUID is a pointer that can be used to point to the particular profile stored in the directory. Because the GUID is used as the pointer and is stored with the feature vector for the individual, latency is decreased when later identifying individuals based on facial image data. In operation 309, the partitioning component 122 adds the GUID to one or more search scopes. For example, in the example above, a single GUID is included in a first search scope for a security checkpoint and a second search scope for a particular flight. The GUID from the directory is able to be used in more than one search scope, rather than generating a new profile for the individual to include in each separate search scope.

In operation 311, data from a live facial scan is received via the object recognition module 118. In the example above, facial data of the individual is obtained via a live facial scan of the individual as the individual goes to board the flight for which they have purchased tickets. In operation 313, the object recognition module 118 executes facial recognition to generate a feature vector of the facial data. The generated feature vector of the facial data is compared to the GUIDs included in the search scope.

In operation 315, the processor 108 identifies a match between the generated feature vector of the facial data and a GUID pulled from the directory and included in the search scope. Based on the identified match, the processor 108 controls to return results in operation 317. In some examples, the results are returned via the user interface device 110 or transmitted over the network 132 via the communications interface device 112. In some examples, the results include the match and a confidence level of the match. In some examples, the results further include some or all of the details stored in the profile associated with the GUID, such as the name, contact information, and so forth of the individual that matches the facial data. As described herein, the GUID is next to the particular data rather than pointing to a separate lookup table that must then be searched, reducing latency and providing results significantly more quickly than current solutions.

As noted above, the method 300 is presented for illustration only and should not be construed as limiting. For example, the method 300 can be implemented to identify matches for objects that are not faces. In these examples, a non-person object is enrolled in a directory, image data is obtained, feature vectors are generated for the object and stored, and the object is tagged with the GUID which is added to a search scope or scopes. Upon a live image scan of an object being received, object recognition is executed to generate a feature vector of the image data received from the live image scan. A match is identified of the feature vector from the live image scan to the GUID included in the search scope and the results are returned.

Some examples of the present disclosure take into account the quality of original live image scans received at the time the individual enrolls. For example, poor quality live image scans can skew the feature vector corresponding to the GUID used to recognize the profile of an object and, accordingly, are to be avoided. Therefore, some examples include a quality filter that reject certain images based on image pose, lighting, etc. In some examples, the same quality filter is used when adding images to a profile of an object. Accordingly, scenarios are used to determine which quality filter is applied and feature vectors that match the use case are then saved. Thus, the recognition model is removed from the methods that add images and detect images as described herein. By knowing the type of image provided and the scenario, all models can be computed for the particular scenario in parallel. Various scenarios can include Physical Access RGB, Physical Access IR, Physical Access any, and Physical Access all. In some examples, a scenario includes a list of scenario versions. Given the scenario, all scenario versions can be computed in parallel, and feature vectors can be checked for the given scenario versions. The results are then combined based on the highest confidence score. In some examples, each scenario version includes fields such as the detection model, the quality filter, and the recognition model.

In some examples, the present disclosure enables the addition of an image to a profile in object data storage for identification or verification. For example, the image can be a facial image and the object data storage can be biometric storage. To deal with an image containing multiple objects, an input object can be specified as an image with a targetObject rectangle. It returns a persistedImageId representing the added image. No image will be stored. Only the extracted feature(s) will be stored on server until Object Image—Delete, Object—Delete is called. In some examples, the features are stored until manually deleted. In other examples, the features are stored for a period of time, such as one day, one week, one month, and so forth, and deleted when the period of time is met. In some examples, the features are deleted from the profile for the individual. In other examples, the entire profile of the individual is deleted. Where the entire profile is deleted, all information included in the profile is deleted, such as the persistedImageID or persistedFaceId, user data, image feature data, such as facial feature data, and so forth.

Adding/deleting images to/from a same object will be processed sequentially while adding/deleting images to/from different objects are processed in parallel. Operation-Location can be used to determine when the image change has been reflected across the service production. Adding an image to an object takes a moment to be reflected in identify calls. Each object may have up to 248 images per recognition type.

As described herein, poor quality images are to be avoided and higher quality images are preferred. Higher image quality leads to a more accurate recognition process. For example, in biometric implementations, high quality facial images include frontal, clear, and face size of 200×200 pixels, e.g., 100 pixels between eyes, or larger. In some examples, the minimum detectable face size is 36×36 pixels in an image no larger than 1920×1080 pixels. Images with dimensions greater than 1920×1080 pixels can require a proportionally larger minimum face size. In some examples, different detection model values are provided. For example, detection_01 can be the default detection model for a large person group to add an image, such as a face, and detection_02 can be an updated detection model that includes improved accuracy especially on small, side, and blurry images, such as faces.

Adding an image to the profile of an object for a scenario requires successfully processing the image for multiple scenario version pipelines because feature vectors are stored for the latest production scenario version and flighting scenario versions, in case detection fails or rollback is needed. In some examples, if a previous scenario version fails any previous pipelines, the image is not added to the profile of the object. In other words, to add and detect an image, the incoming image must pass all pipelines to ensure each object in each search group is always considered in every identify call. In some examples, some scenario versions are disabled.

In some examples, adding an image to the profile of an object requires verifying the identity of the object at the time of enrollment. For example, when the object is a person, a live image scan of the person's face can be manually confirmed using an additional method of authentication, such as confirming against a driver's license photograph, passport photograph, previous facial image data stored in the individual's profile, other biometric data, and so forth.

In some examples, adding an image includes storing an operation location for the feature vector corresponding to the image. The operation location is used to determine when an image change has been made and/or reflected across the service production.

Some examples of the present disclosure include serialize/deserialize methods to improve performance. Some examples of the present disclosure include a reverse search scope lookup method. When adding the profile of an object to a group, which search groups the profile of the individual has been added to is also saved. Saving the search groups enables a reverse lookup method to return results that include each search scope that includes the particular GUID for the profile of the individual.

In some examples, the directory that stores profiles including each object's data is referred to as a centralized directory, such as the enrollment database 210. By centralizing the data in a single directory, only one copy is referenced to search. Dereferencing references, i.e., pointers, has a cost when removed from memory. In memory, dereferencing is fast, but when removed from the local machine, another machine (i.e., a database layer) must be introduced to communicate with the original machine. However, in the present disclosure, a single centralized person can be referenced in any number of search scopes because the searches are performed in parallel to a centralized reference. In some examples, a feature vector for each enrolled object is maintained in a pre-aggregated binary large object (BLOB) that is partitioned based on the recognition model type. In some examples, the BLOB is an in-memory cached version of the enrollment database 210 described in greater detail above. For example, NIST raw face feature vectors are 1024 bytes, or 256 floats.

As described herein, various examples of the present disclosure remove the need for training data. Conventional Train methods calculate an average image from all images for a particular object in the database. Aspects of the present disclosure remove the need for Train by updating the average image, i.e., the feature vector, at the time a new image is added to the directory. By implementing cloud storage that enables all images for the profile of an object to be obtained with one row read, the feature vector is calculable and written back for multiple images in parallel and locking is not required. In some examples, calls for an object can be serialized, or a bulk image upload can be received to further enhance aspects of the present disclosure. In addition, no explicit Train( )function is required. Instead, eventual consistency provides identify/grouping performance.

For example, the database is updated to include new data, such as profiles of new objects and/or new image data for existing objects. A message is placed in a queue to update intermediate/cache layers. Using a pole operation, the intermediate/cache layers are updated. In order to delete an object or update a profile of an object, it must be known where the object's feature vector is saved or stored in the intermediate page BLOB. This is assisted by the use of the partitions as described in greater detail below.

Figure 4:
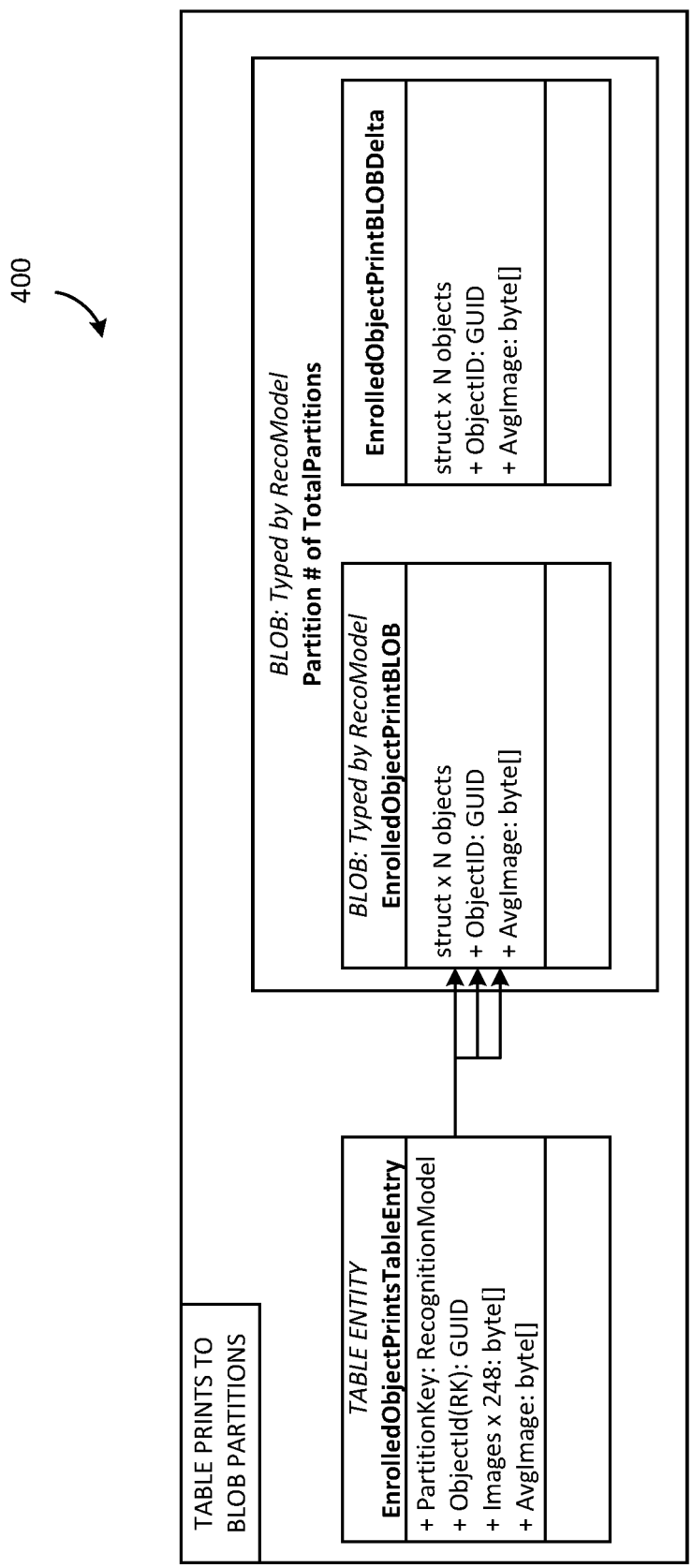
FIG. 4 is a block diagram illustrating transitioning table feature vectors to BLOB partitions according to examples of the present disclosure.

FIG. 4 illustrates a block diagram for transitioning table feature vectors to BLOB partitions according to examples of the present disclosure. The block diagram 400 of FIG. 4 is for illustration only and should not be construed as limiting. Various examples of the block diagram 400 can be used without departing from the scope of the present disclosure.

As shown in FIG. 4, the database flat list is split into partitions based on a range of object IDs and/or a number of partitions. In some examples, the range of object IDs is a lexicographical range. In some examples, the table entity illustrated in FIG. 4 is an azure table entity that stores a partition key, object ID, up to 248 images, and an average image that is the feature vector. Any changes in the table entity are folded into the enrolled object print BLOB and the changes are stored in the enrolled object print BLOB delta.

In some examples, a partition is generated by reading a first EnrolledObjectPrintBLOB and then a smaller, second EnrolledObjectPrintBLOB. For example, the second EnrolledObjectPrintBLOB is smaller than the first EnrolledObjectPrintBLOB by at least one order of magnitude. In some examples, the first EnrolledObjectPrintBLOB can be as large as several megabytes. Due to the larger size of the first EnrolledObjectPrintBLOB, caching files takes less time than caching files in a larger BLOB due to the relatively few changes in the larger first EnrolledObjectPrintBLOB. In addition, due to the smaller size of the second EnrolledObjectPrintBLOB, the time required to read and write to the second EnrolledObjectPrintBLOB is reduced. In other words, reading the smaller, second EnrolledObjectPrintBLOB, adding and/or removing one or more prints, and writing a new, or updated, second EnrolledObjectPrintBLOB requires less time due to the smaller size of the second EnrolledObjectPrintBLOB. The time required to read and process a file is linear with regards to the file size, so the second EnrolledObjectPrintBLOB is maintained within a manageable size, such as within a few kilobytes, to maintain performance. Accordingly, in some examples, changes are written to the second EnrolledObjectPrintBLOB but are not written to the first EnrolledObjectPrintBLOB.

Figure 5:
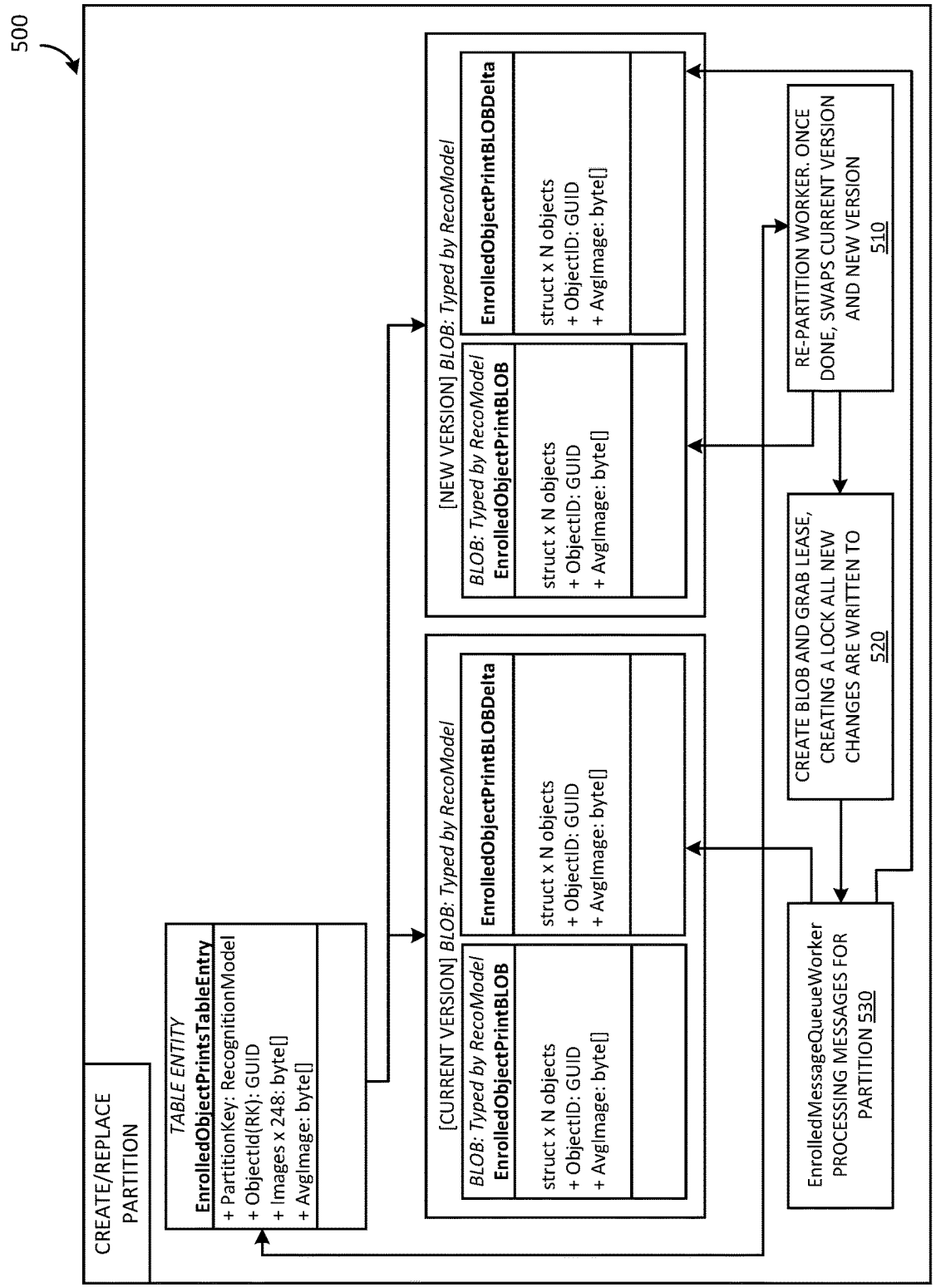
FIG. 5 is a block diagram illustrating creating and/or replacing data according to examples of the present disclosure.

FIG. 5 illustrates a block diagram for creating and/or replacing data according to various examples of the present disclosure. The block diagram 500 of FIG. 5 is for illustration only and should not be construed as limiting. Various examples of the block diagram 500 can be used without departing from the scope of the present disclosure.

In some examples, the block diagram 500 folds the delta BLOB, such as the delta BLOB illustrated in FIG. 4, into a larger BLOB. In some examples, the block diagram 500 changes the number of partitions with an additional bit. In some examples, the execution of creating and/or replacing a partition occurs in parallel, such as due to using a lexicographical search.

FIG. 5 illustrates a table entity of enrolled objects that includes a partition key, object ID, up to 248 images, and the average image that is the feature vector. Current and new versions of the BLOB typed by recognition model are also provided as shown and described in FIG. 4. At block 510, the worker node is repartitioned and the new version of the BLOB is swapped with the current version. As shown in FIG. 5, the BLOB of the enrolled object print BLOB in the new version is created directly from the database, such as the database 210.

At block 520, the BLOB is created and the lease is grabbed. This effectively creates a lock to which all new changes will be written. At block 530, messages are processed for the enrolled message queue worker. For example, the messages can be used to generate the enrolled person print BLOB delta as shown in FIG. 5. In examples where an update lease is grabbed, the new version of the enrolled person print BLOB delta is updated.

In some examples, a partition approaches a size that is too large to maintain performance standards. For example, the second EnrolledObjectPrintBLOB of the partition approaches a size that is too large. In this example, a new instance of the partition is created and the second EnrolledObjectPrintBLOB is folded into the first EnrolledObjectPrintBLOB. Due to the time sometimes required to complete this process, the changes made during the folding process are written to both the existing second EnrolledObjectPrintBLOB as well as the new instance of the partition. Once the new instance of the first EnrolledObjectPrintBLOB is completed, the active partition is updated so that the new instance of the first EnrolledObjectPrintBLOB is now the active partition and the performance is maintained.

Figure 6A:
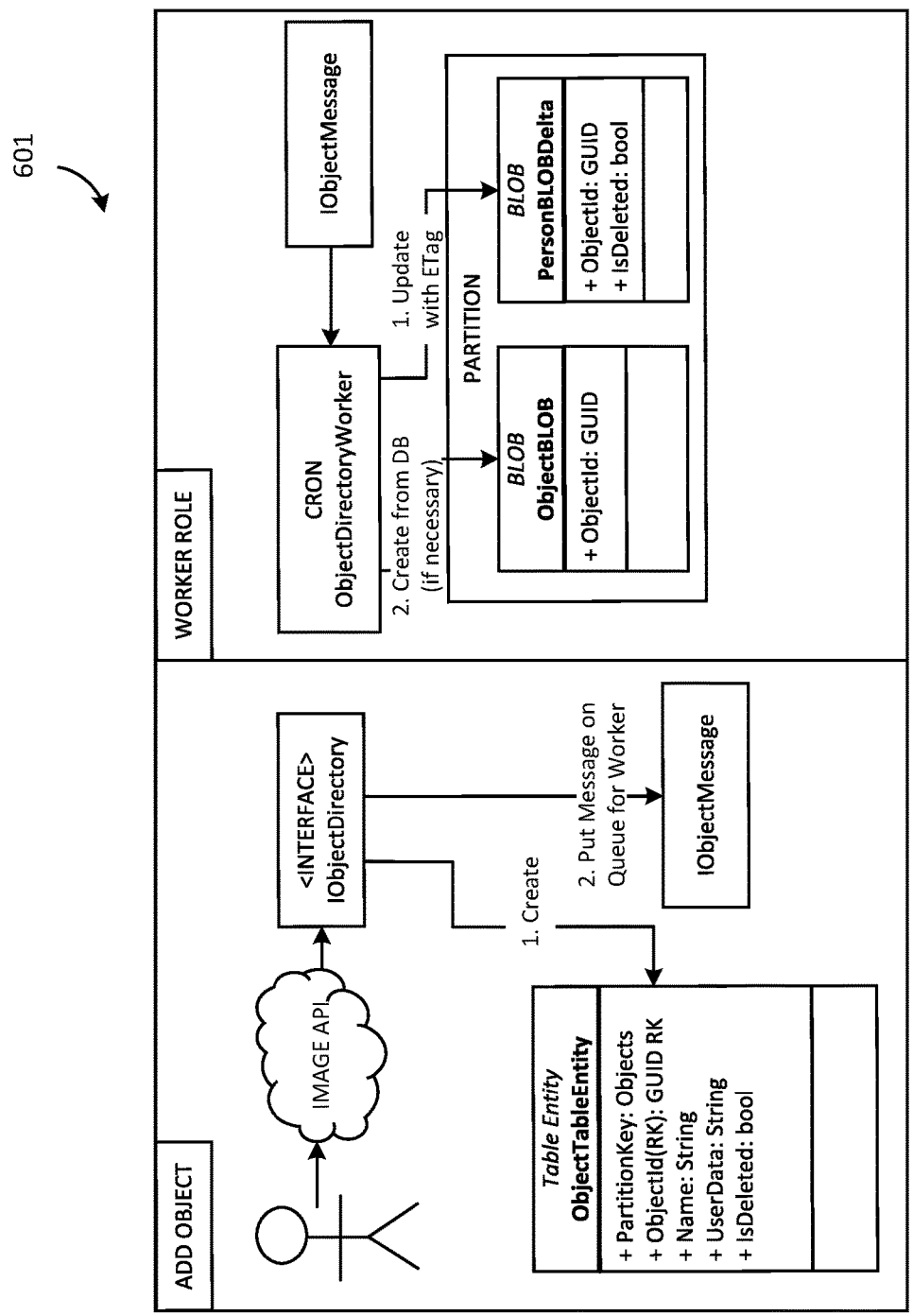
FIG. 6A is a block diagram illustrating adding an object to the directory according to an example of the present disclosure.

FIG. 6A is a block diagram illustrating adding an object to the directory according to an example of the present disclosure. The block diagram 601 is presented for illustration only and should be construed as limiting. Various examples of the block diagram 601 can be used without departing from the scope of the present disclosure. The block diagram 601 is implemented by one or more components described herein, such as the computing device 102.

In particular, FIG. 6A illustrates a block diagram 601 for adding an object to a directory, such as the database 210. As described herein, in some examples the object is a person and a new profile for the person is created in the directory. An image API is called into the interface. A key value table, such as an Azure table, is accessed and a new object creation is executed. A new GUID is created and additional data regarding the object is added. The additional data includes other information regarding the object, such as identifying information. In examples where the object is a person, the additional data can include a phone number, an email address. The new object is placed into a queue to update the BLOB delta and a message is sent indicating the presence of a new object in the queue to inform the worker role of the state of the queue.

The worker role selects the object, among other new objects, for updating the BLOB delta. In other words, more than one new object is created and batched for updating the BLOB delta within the partitions at the same time rather than updating the partition with a single new object. For example, because the identify calls are executed against the partitions, updates to the partitions are ideally performed less frequently because a cache is invalidated upon the update being performed. In some examples, a maximum number of updates can be performed at a single time so as to minimize invalidating of the cache while maximizing updating resources. For example, a maximum of one thousand objects are added from the queue at a single time.

A log of partitions is maintained that identifies each partition and the data stored within it to keep up time. In some examples, multiple partitions point to the same data due to the size of a delta BLOB. When the delta BLOB for a partition becomes too large, a new partition is created and a new delta is folded into the new partition. All the new changes are merged into the new partition file. When an identification call is executed against the partitions, the most recent partition is identified and searched due to possible delays in consolidating, or folding in, each redundant partition file. In other words, adding the object writes only to the delta BLOB file, when is then used to update the partitions.

Figure 6B:
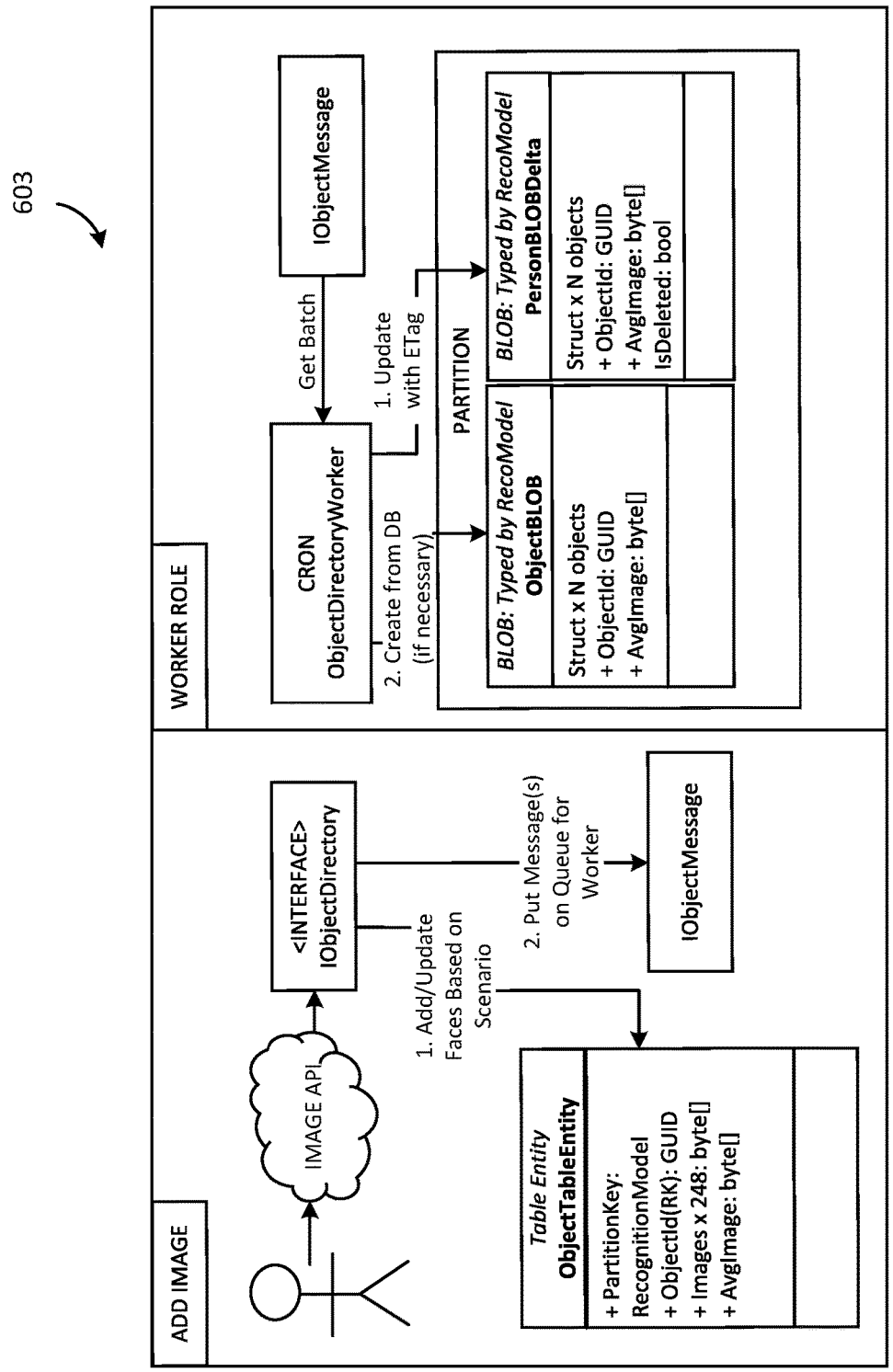
FIG. 6B is a block diagram illustrating updating an object's profile in the directory according to an example of the present disclosure.

FIG. 6B is a block diagram illustrating updating an object's profiles in the directory according to an example of the present disclosure. The block diagram 603 is presented for illustration only and should be construed as limiting. Various examples of the block diagram 603 can be used without departing from the scope of the present disclosure. The block diagram 603 is implemented by one or more components described herein, such as the computing device 102.

In particular, FIG. 6B illustrates a block diagram 603 for adding an image to a profile of an object in a directory, such as the database 210. In examples where the object is a person, the image added to the profile is a face. In some examples, the process of adding an image to an object is similar to creating the object. The list of objects that exist is compared with the list of feature vectors, allowing multiple types of recognition models to be used. This allows updating or deleting objects to be easily performed. For example, to add the image, the feature vector is added to the existing object profile by updating the delta BLOB from a queue, which is updated at intervals so as to not unnecessarily invalidate the cache. When deleting an object or deleting an image included in a profile, this process enables the profile to be deleted from each partition in which it is included at once, rather than deleting the profile from each partition individually.

Figure 6C:
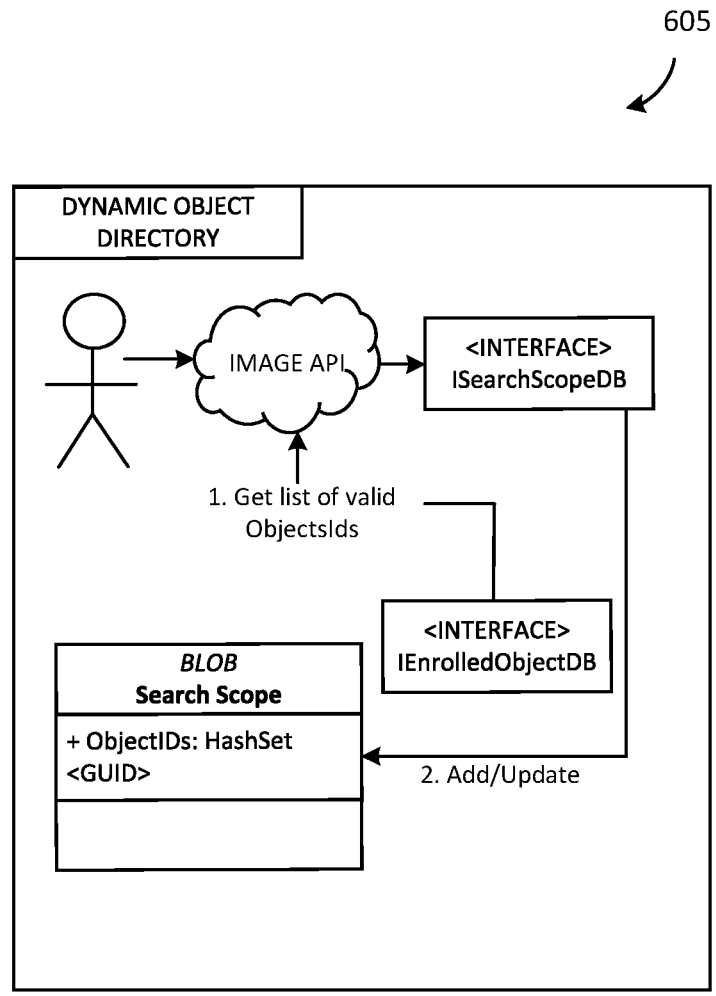
FIG. 6C is a block diagram illustrating implementing profiles in a search scope according to an example of the present disclosure.

FIG. 6C is a block diagram illustrating implementing the profiles in a search scope according to an example of the present disclosure. The block diagram 605 is presented for illustration only and should be construed as limiting. Various examples of the block diagram 605 can be used without departing from the scope of the present disclosure. The block diagram 605 is implemented by one or more components described herein, such as the computing device 102.

In particular, FIG. 6C illustrates a block diagram 605 for including a particular profile from the directory, such as the database 210, in a search scope. As shown in FIG. 6C, the image API gets a list of valid ObjectsIDs from the IEnrolledObjectDB. The ISearchScopeDB executes the image API to add the GUID to a search scope BLOB. In some examples, the block diagram 605 illustrates adding a GUID to a search as described in greater detail above with regards to operation 309.

Figure 6D:
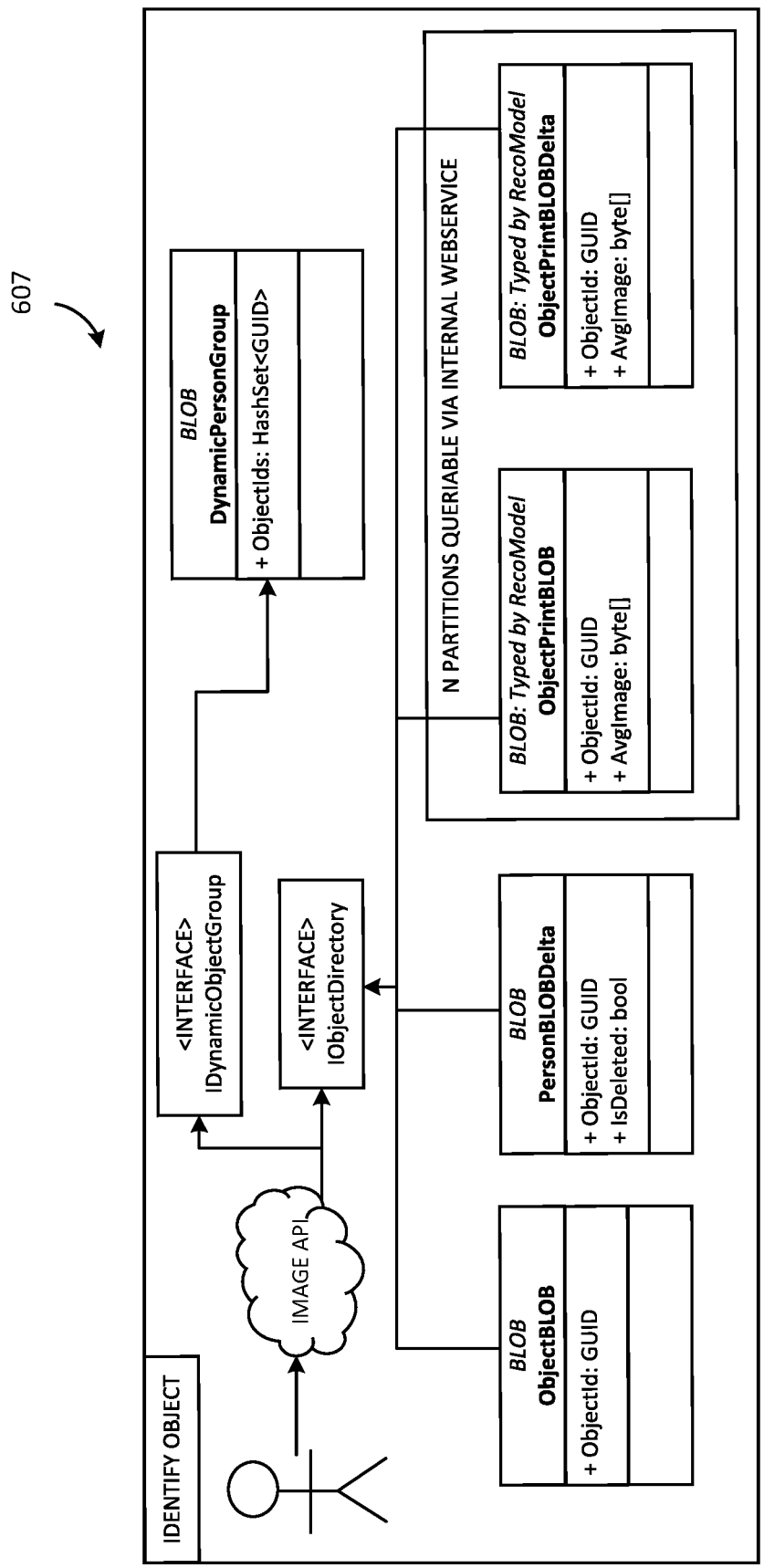
FIG. 6D is a block diagram illustrating identifying an object within the search scope according to an example of the present disclosure.

FIG. 6D is a block diagram illustrating identifying an object within the search scope according to an example of the present disclosure. The block diagram 607 is presented for illustration only and should be construed as limiting. Various examples of the block diagram 607 can be used without departing from the scope of the present disclosure. The block diagram 607 is implemented by one or more components described herein, such as the computing device 102.

In some examples, the database 210 flat list, i.e., the directory, is split into partitions based on the lexicographical range of the object's or individual's identifications (e.g., GUIDs) and/or the number of partitions. The partitions can then be searched directly from the directory. In some examples, each partition search is distributed in parallel in order to support larger search scopes while maintaining a low latency. For example, a partition can be searched, and matching feature vectors extracted, allowing feature vectors to be cached for faster requirements of search scopes on repeat calls. In other words, searching each partition in parallel rather than searching the entire directory maintains a low latency due to the parallelized/distributed search. Therefore, subterraneous searches can be performed by caching BLOBs on nodes, resulting in the cloud database BLOBs not needing to be retrieved for every request. In some examples, a content aware load balancer can be leveraged to pass requests from the front end to the backend and enable stickiness by allowing worker nodes to reconnect based on unique partition tokens to backend worker nodes that have previously searched and/or worked on the partition and still have data in memory. In some examples, the first search scope is a distributed map/reduced query that increases performance by reducing the size of each search field. Including delta add/removals further enables adding and removing profiles of individuals to a search scope more quickly, which in turn enables caching the bulk of individuals listed in search scopes.

Figure 7:
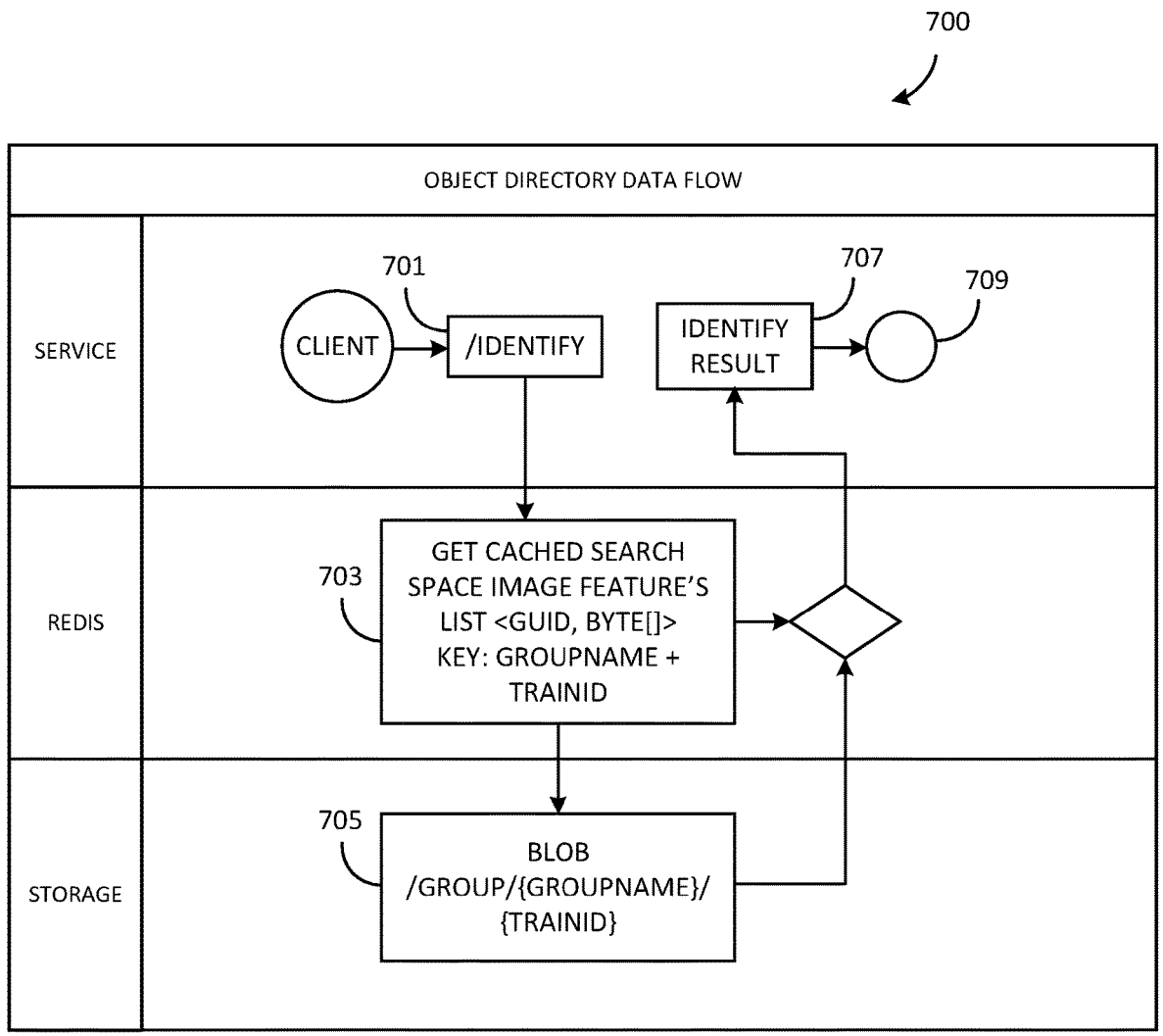
FIG. 7 is a computerized method of object data storage data flow according to examples of the present disclosure.

FIG. 7 is a computerized method of object data storage data flow according to various examples of the present disclosure. The computerized method 700 is presented for illustration only and should be construed as limiting. Various examples of the computerized method 700 can be used without departing from the scope of the present disclosure. The computerized method 700 is implemented by one or more components described herein, such as the computing device 102.

The computerized method 700 begins by a service identifying a client executing an identify action at operation 701. The identify operation searches a directory, such as the database 210, for a result. In some examples, the result is a particular profile of an object stored in the database. In operation 703, a cache, for example a redis cache, retrieves a cached search space image features list. In some examples, the features list is provided in a <GUID, byte[ ]> format. In some examples, the key value is a group name+training ID. In operation 705, storage, for example the data storage device 124, searches a BLOB for the group, group name, and training ID retrieved by the cache. In operation 707, the services identifies the results of the cache and the storage. In some examples, the results indicate the object corresponding to the GUID. In operation 709, the identified results are output. In some examples, the identified results are output to a user interface device. In some examples, the identified results are output to an external device via the network 132.

Figure 8:
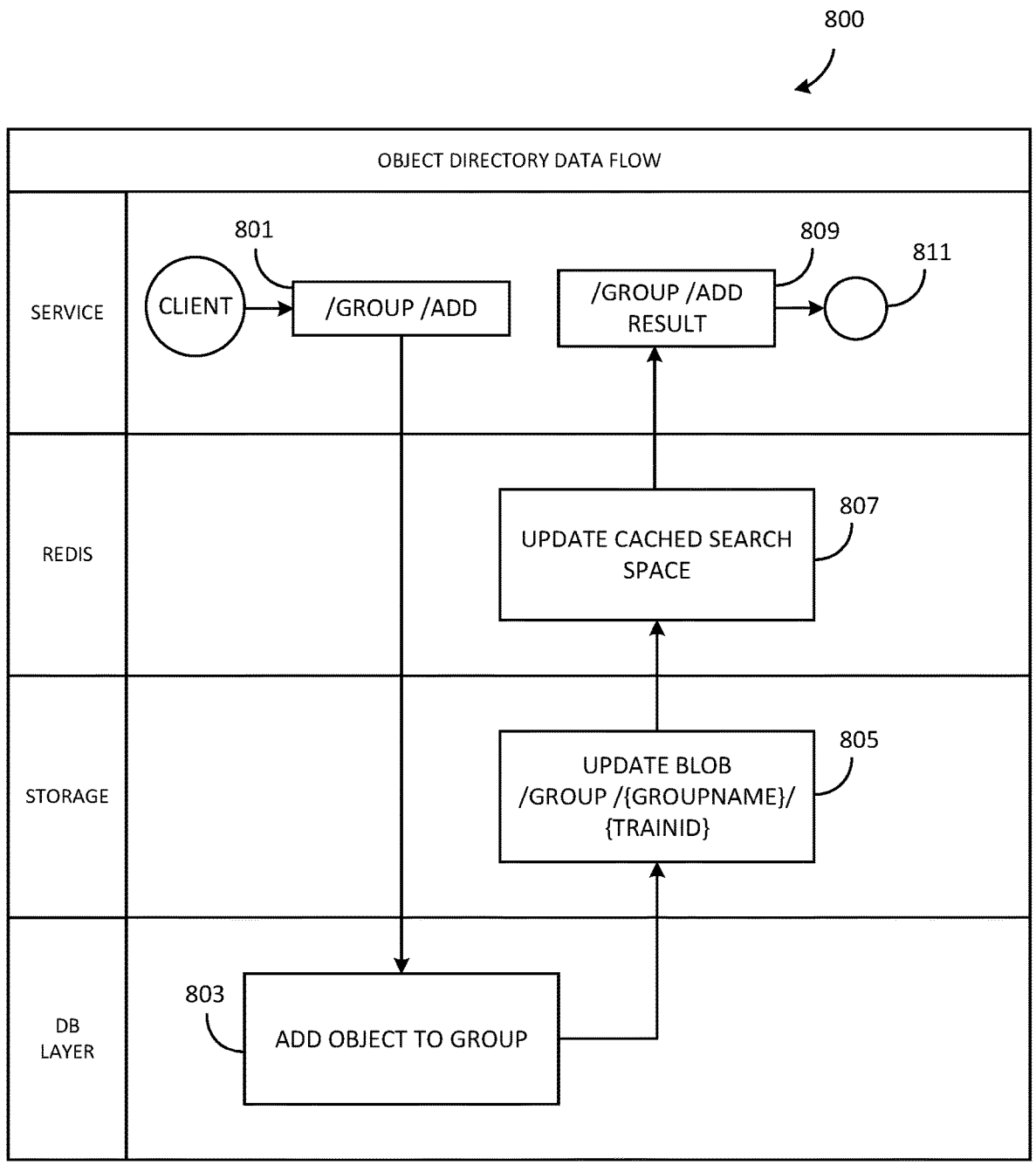
FIG. 8 is a computerized method of object data storage data flow according to various examples of the present disclosure.

FIG. 8 is a computerized method of object data storage data flow according to various examples of the present disclosure. The computerized method 800 is presented for illustration only and should be construed as limiting. Various examples of the computerized method 800 can be used without departing from the scope of the present disclosure. The computerized method 800 is implemented by one or more components described herein, such as the computing device 102.

The computerized method 800 begins by a service identifying a client executing a group add action at operation 801. The identify operation identifies an object to be added to a group, such as a search scope. In operation 803, a database layer, such as the database 210, adds the object to the particular group. In some examples, adding the object to the particular group includes adding the object to a particular partition within the database 210. In operation 805, storage, for example the data storage device 124, updates a BLOB to include the added object to the group. For example, the storage updates the group, group name, and training ID to include the newly added object. In operation 807, a cache, for example a redis cache, updates the cached search space to include the updated BLOB. In operation 809, the service identifies or confirms the group add result of the added object to the group. In operation 811, the results are output. In some examples, the results are output to a user interface device. In some examples, the results are output to an external device via the network 132.

Figure 9:
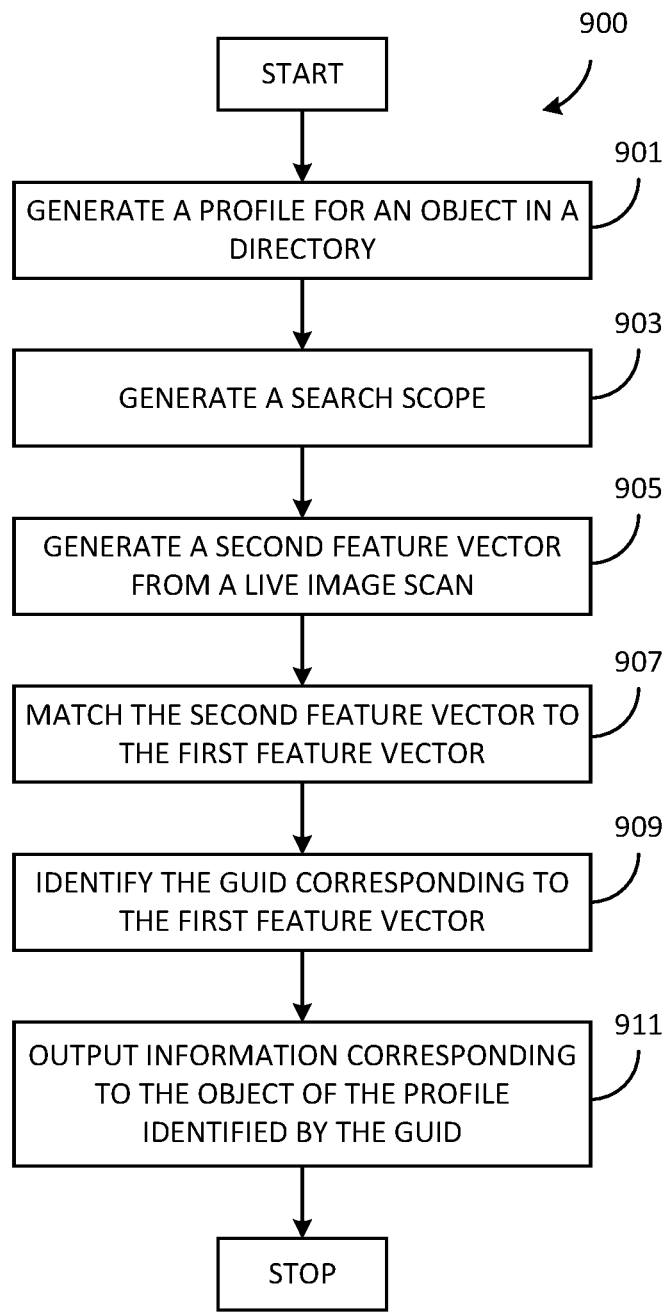
FIG. 9 is a computerized method of object data storage according to examples of the present disclosure.

FIG. 9 is a computerized method of object data storage according to various examples of the present disclosure. The computerized method 900 is presented for illustration only and should be construed as limiting. Various examples of the computerized method 900 can be used without departing from the scope of the present disclosure. The computerized method 900 is implemented by one or more components described herein, such as the computing device 102.

The method 900 begins by the computing device 102 generating a profile for an object in a directory in operation 901. In some examples, the directory is a database, such as the database 210. The profile includes a first feature vector that corresponds to the object and a global unique identifier (GUID) that corresponds to the first feature vector in the profile. In some examples, the first feature vector is generated by obtaining original image data corresponding to the object and generating the first feature vector corresponding to the object based on the obtained original image data.

In some examples, the computing device 102 generates a plurality of partitions within the directory. The generated profile for the object is classified into one or more of the generated plurality of partitions.

In operation 903, the computing device 102 generates a search scope. The search scope includes at least the GUID that corresponds to the profile. In some examples, the search scope includes a plurality of GUIDs, each of which corresponds to a separate profile. In other words, the search scope identifies that objects that are to be searched, and identifies the objects via the respective GUIDs. In some examples, the generated search scope includes the plurality of partitions.

In operation 905, the computing device 102 generates a second feature vector from a live image scan. In some examples, the computing device 102 executes an object recognition application to generate the second feature vector. It should be understood that as used herein, the terms "first" feature vector and "second" feature vector only to distinguish the feature vector corresponding to the profile of the stored object from the feature vector generated from a live image scan. The first feature vector can also be referred to as an original feature vector, a stored object feature vector, and so forth. The second feature vector can also be referred to as a live image scan feature vector.

In some examples, a second search scope is generated that includes the GUID corresponding to the profile. In other words, a single GUID corresponding to a profile can be included in multiple search scopes that are executed in parallel simultaneously or substantially simultaneously in order to improve the time required to match the generated second feature vector to the first feature vector.

In operation 907, the computing device 102 matches the generated second feature vector from the live image scan to the first feature vector using the generated search scope. In other words, the second feature vector, generated from the live image scan, is matched to the first feature vector stored in the directory.

In operation 909, the computing device 102 identifies the GUID corresponding to the first feature vector that matches the second feature vector. In other words, the GUID points to the particular profile of the object that, based on the match of its feature vector, matches the second feature vector. In so doing, an object that is stored in the directory is identified as matching the object of which the live image scan was obtained.

In operation 911, the computing device 102 outputs the information corresponding to the object of the profile identified by the GUID as corresponding to the first feature vector. In some examples, the information is output to a user interface, such as the user interface device 110. In some examples, the information is output to an external device via the network 132.

In some examples, the object stored in the directory is an individual, i.e., a person, and the live image scan is a live facial scan. In this example, the information output in operation 911 is information regarding the individual, such as contact information, a date of birth, and so forth.

Figure 10:
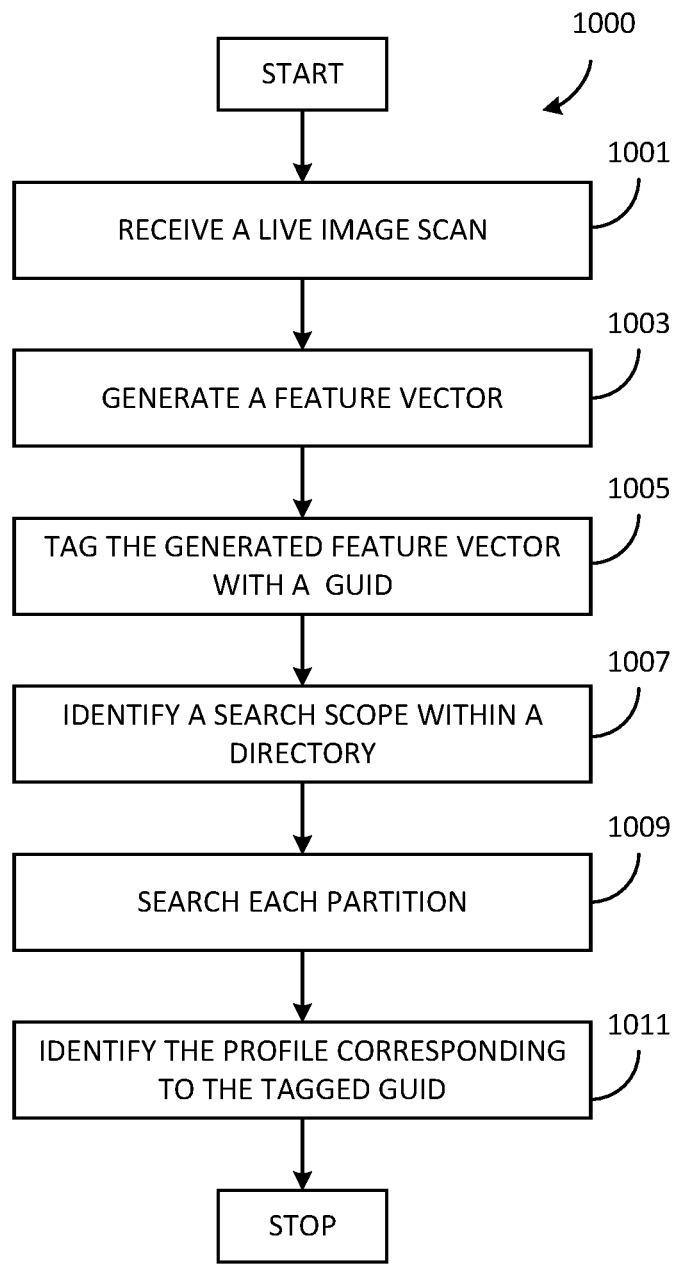
FIG. 10 is a computerized method of retrieving a stored object profile according to examples of the present disclosure.

FIG. 10 is a computerized method of retrieving a stored object profile according to various examples of the present disclosure. The computerized method 1000 is presented for illustration only and should be construed as limiting. Various examples of the computerized method 1000 can be used without departing from the scope of the present disclosure. The computerized method 1000 is implemented by one or more components described herein, such as the computing device 102.

The method 1000 begins by the computing device 102 receiving a live image scan from an electronic device, such as a camera, in operation 1001. The live image scan provides a scan and image data of an object. In operation 1003, the computing device 102 generates a feature vector from the live image scan. In operation 1005, the computing device 102 tags the generated feature vector with a global unique identifier (GUID).

In operation 1007, the computing device 102 identifies a search scope within a directory. In some examples, the directory is a database such as the database 210. The search scope includes a plurality of partitions within the directory. The directory includes a profile of an object that includes information corresponding to the object and a stored GUID corresponding to the profile.

In operation 1009, the computing device 102 searches each partition of the plurality of partitions, in parallel, for the stored GUID corresponding to the tagged GUID. In operation 1011, the computing device 102 identifies the profile in the directory that corresponds to the tagged GUID. Once the profile is identified, the computing device 102 can perform various operations. In some examples, the computing device 102 modifies the information in the identified profile of the object. In some examples, the computing device 102 deletes the information in the identified profile of the object. In some examples, the computing device 102 deletes the identified profile of the object.

As described herein, the database layer is implemented as a centralized directory that has no limit on the number of profiles of individuals that can be added. The database layer includes a plurality of field names, including a partition key, a row key, a GUID, a person ID such as a name, user data such as contact information, and groups such as all groups the ID is referenced by. The database layer stores feature vectors for an object, such as the feature vector corresponding to the received image data. In some examples, the object is a face, the feature vectors are face feature vectors, and the received image data is received facial image data. In some examples, the directory is limited to 248 feature vectors per recognition model type and includes a plurality of field names, including a partition key, a row key, a feature vector, an average image such as the feature vector described herein, and the image number which can contain up to the 248 columns, each column corresponding to a separate feature vector. In some examples, the database layer stores which objects have recently had feature vectors updated and need to have groups updated. In these examples, various field names include a partition key, a row key, a feature vector, groups such as groups that are pending to be updated and completed groups such as groups that have been updated. A search group within the database layer includes field names including a partition key, a row key, a GUID, and is deleted, which indicates the nullable time the object was deleted.

Various examples of the present disclosure include options to create a profile of an object within the database, delete a profile of an object within the database, add a profile to a group, remove a profile from a group, add or delete a feature vector for a profile, and identify an object based on a live image scan. For example, to create a profile of an individual, the individual is assigned a new GUID. The system checks to make sure the GUID is unique and does not conflict with another GUID and/or profile of an object already in the system. The information for the object, such as feature vector, GUID, contact information where the object is an individual, and so forth, is entered, and the new profile for the object is committed. To delete a profile, the isDeleted field is updated to a particular date and time at which the profile is to be deleted and all the groups are moved to the pending delete folder. To add a profile to a group, the object GUID and group ID, e.g., a group GUID, are each identified and cross-referenced to confirm the profile is not already included in the group. The object GUID is then written to the group GUID using an ETag and the cache is updated. To remove a profile from a group, the object GUID and group ID, e.g., a group GUID, are each identified and cross-referenced to confirm the profile is included in the group. The object GUID is then removed from the group GUID and the cache is updated. To add a feature vector for a profile, the object GUID is called, the feature vector is added to a table and committed. To delete a feature vector for a profile, the object GUID is called, the feature vector is deleted from the table and committed. To identify an object based on the live image scan, the live image data from the live image scan is obtained, the cache for the search scope group is loaded, a comparison is executed against the loaded data, actual data is loaded for close matches, and results and a confidence level of the results are returned.

In some examples, the various options described herein can be performed in parallel, i.e., substantially simultaneously. For example, adding and/or deleting image data from different profiles can be processed and performed in parallel. As another example, adding and/or deleting image data for a same profile of an individual can be processed and performed sequentially and immediately. In other words, as soon as a first image data completes processing, a second image data begins processing.

In some examples, the database stores object data in a table that includes an object ID, feature vectors, recognition model type, any data regarding a scheduled soft delete of the individual data, and, where the object is a person, user supplied information such as contact information and metadata. A separate table is provided for each profile that stores the data. The object data can be stored in a group declare list and/or in intermediate storage, such as when the group data is scheduled for updates. In some examples, the database includes a search scope, which is a quick group creation hydrated from the enrollment database that is cached in an in-memory data structure store.

Various examples of the present disclosure utilize one or more BLOBs, as described herein. A BLOB page layout includes the GUID for the object and a raw feature vector. Some examples further incorporate a temporary delta BLOB to prevent having to completely rehydrate. The options to add a profile, remove a profile, and update an image for a profile can update the delta BLOB first and, once a limit is reached, a full refresh is initiated.

Some examples of the present disclosure include a machine learning component to optimize the parallelized searching of the partitions. Additional examples of the present disclosure further include a neural network that further optimizes the machine learning component.

Additional aspects and examples disclosed herein are directed to a system, method, and/or one or more computer storage devices having computer-executable instructions stored thereon for object data storage.

Alternatively, or in addition to the other examples described herein, examples include any combination of the following:

- generating a profile for an object in a directory, the profile including a first feature vector corresponding to the object and a global unique identifier (GUID) corresponding to the first feature vector in the profile;
- generating a search scope, the search scope including at least the GUID corresponding to the profile;
- generating a second feature vector from a live image scan;
- matching the generated second feature vector from the live image scan to the first feature vector using the generated search scope;
- identifying the GUID corresponding to the first feature vector that matches the second feature vector;
- outputting information corresponding to the object of the profile identified by the GUID corresponding to the first feature vector;
- generating a plurality of partitions within the directory;
- classifying the generated profile for the object in the directory into one of the generated plurality of partitions;
- the generated search scope includes the plurality of partitions;
- searching each partition of the plurality of partitions in parallel for the first feature vector corresponding to the second feature vector;
- obtaining original image data corresponding to the object;
- generating the first feature vector corresponding to the object;
- to identify the GUID as corresponding to the first feature vector that matches the second feature vector, identifying the generated second feature vector matches the first feature vector corresponding to the GUID;
- generating a second search scope, the second search scope including the GUID corresponding to the profile;
- generating the second feature vector from the live image scan includes executing an object recognition application;
- the object is an individual;
- the live image scan is a live facial scan;
- receiving, from an electronic device, a live image scan;
- generating a feature vector from the live image scan;
- tagging the generated feature vector with a global unique identifier (GUID);
- identifying a search scope within a directory, the search scope including a plurality of partitions within the directory, wherein the directory includes a profile of an object that includes information corresponding to the object and a stored GUID corresponding to the profile;
- searching, in parallel, each partition of the plurality of partitions for the stored GUID corresponding to the tagged GUID;
- identifying the profile corresponding to the tagged GUID;
- modifying the information in the identified profile of the object;
- deleting the information in the identified profile of the object; and
- deleting the identified profile of the object.

Exemplary Operating Environment

Figure 11:
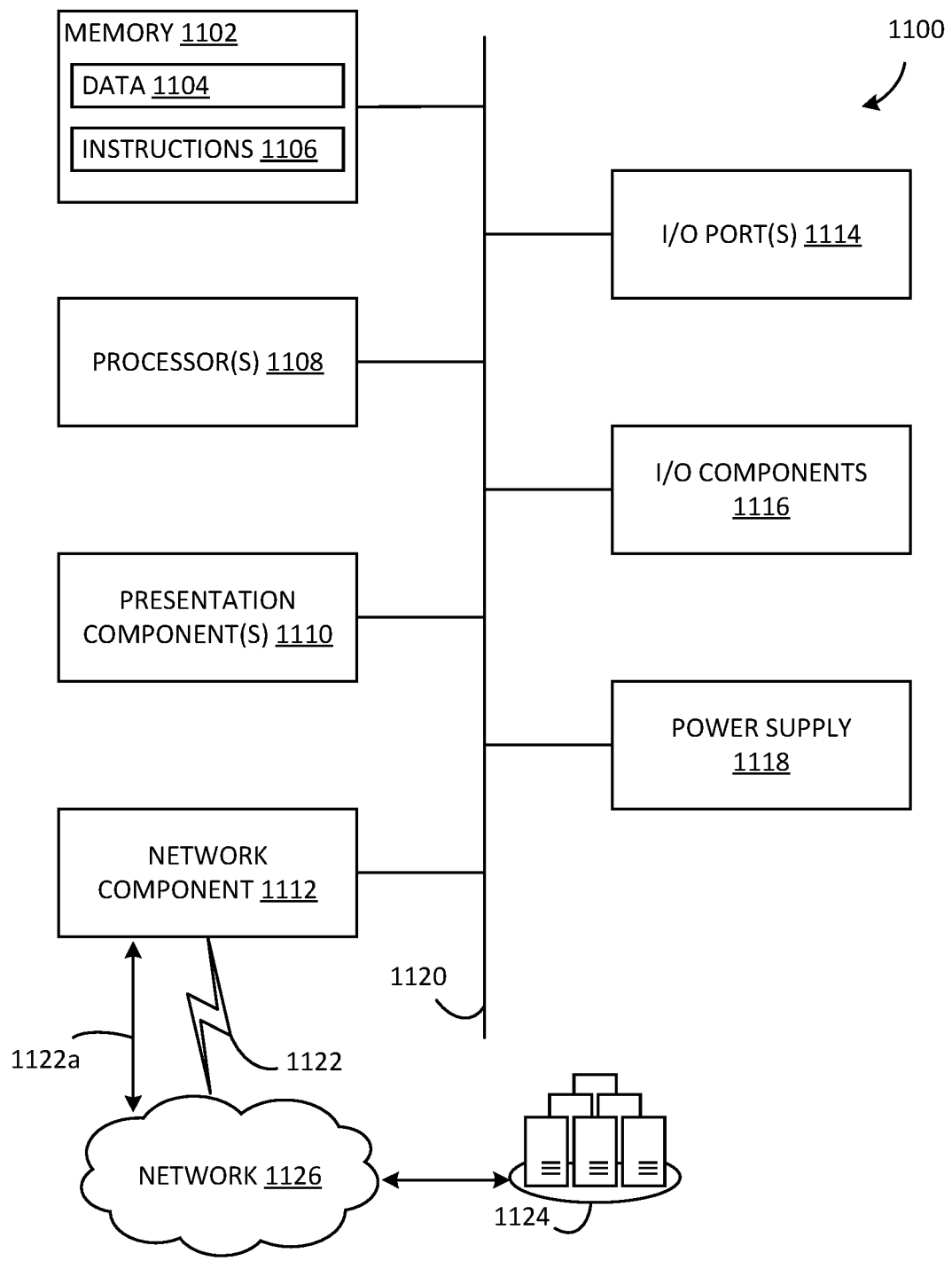
FIG. 11 is a block diagram illustrating an example computing device for implementing examples of the present disclosure.

FIG. 11 is a block diagram illustrating an example computing device 1100 for implementing aspects disclosed herein and is designated generally as computing device 1100. Computing device 1100 is an example of a suitable computing environment and is not intended to suggest any limitation as to the scope of use or functionality of the examples disclosed herein. Neither should computing device 1100 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1100 includes a bus 1120 that directly or indirectly couples the following devices: computer-storage memory 1102, one or more processors 1108, one or more presentation components 1110, I/O ports 1114, I/O components 1116, a power supply 1118, and a network component 1112. While computing device 1100 is depicted as a seemingly single device, multiple computing devices 1100 may work together and share the depicted device resources. For example, memory 1102 may be distributed across multiple devices, and processor(s) 1108 may be housed with different devices.

Bus 1120 represents what may be one or more busses (such as an address bus, data bus, or a combination thereof). Although the various blocks of FIG. 11 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 11 and the references herein to a "computing device." Memory 1102 may take the form of the computer-storage media references below and operatively provide storage of computer-readable instructions, data structures, program modules and other data for computing device 1100. In some examples, memory 1102 stores one or more of an operating system, a universal application platform, or other program modules and program data. Memory 1102 is thus able to store and access data 1104 and instructions 1106 that are executable by processor 1108 and configured to carry out the various operations disclosed herein.

In some examples, memory 1102 includes computer-storage media in the form of volatile and/or nonvolatile memory, removable or non-removable memory, data disks in virtual environments, or a combination thereof. Memory 1102 may include any quantity of memory associated with or accessible by computing device 1100. Memory 1102 may be internal to computing device 1100 (as shown in FIG. 11), external to computing device 1100, or both. Examples of memory 1102 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 1100. Additionally, or alternatively, memory 1102 may be distributed across multiple computing devices 1100, for example, in a virtualized environment in which instruction processing is carried out on multiple computing devices 1100. For the purposes of this disclosure, "computer storage media," "computer-storage memory," "memory," and "memory devices" are synonymous terms for computer-storage memory 1102, and none of these terms include carrier waves or propagating signaling.

Processor(s) 1108 may include any quantity of processing units that read data from various entities, such as memory 1102 or I/O components 816 and may include CPUs and/or GPUs. Specifically, processor(s) 1108 are programmed to execute computer-executable instructions for implementing aspects of the disclosure. The instructions may be performed by the processor, by multiple processors within computing device 1100, or by a processor external to client computing device 1100. In some examples, processor(s) 1108 are programmed to execute instructions such as those illustrated in the in the accompanying drawings. Moreover, in some examples, processor(s) 1108 represent an implementation of analog techniques to perform the operations described herein. For example, the operations may be performed by an analog client computing device 1100 and/or a digital client computing device 1100. Presentation component(s) 1110 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1100, across a wired connection, or in other ways. I/O ports 1114 allow computing device 1100 to be logically coupled to other devices including I/O components 1116, some of which may be built in. Example I/O components 1116 include, for example but without limitation, a microphone, joystick, game pad, satellite dish, scanner, printer, wireless device, etc.

Computing device 1100 may operate in a networked environment via network component 1112 using logical connections to one or more remote computers. In some examples, network component 1112 includes a network interface card and/or computer-executable instructions (e.g., a driver) for operating the network interface card. Communication between computing device 1100 and other devices may occur using any protocol or mechanism over any wired or wireless connection. In some examples, network component 1112 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1112 communicates over wireless communication link 1122 and/or a wired communication link 1122a to a cloud resource 1124 across network 1126. Various different examples of communication links 1122 and 1122a include a wireless connection, a wired connection, and/or a dedicated link, and in some examples, at least a portion is routed through the internet.

Although described in connection with an example computing device, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

What is claimed is:

1. A method for object data storage, the method comprising:
   generating a first feature vector from original image data corresponding to an object;
   receiving scenario data, the scenario data indicating a quality filter applied to the original image data;
   generating a profile for the object in a directory, the profile including the first feature vector corresponding to the object, the scenario data, and a global unique identifier (GUID) corresponding to the first feature vector in the profile;
   receiving new image data corresponding to the object;
   determining whether a new quality filter applied to the new image data matches the quality filter applied to the original image data using the scenario data;
   based on determining that the new quality filter matches the quality filter, adding the new image data to the profile;
   generating a search scope, the search scope including at least the GUID corresponding to the profile;
   generating a second feature vector from a live image scan;
   matching the generated second feature vector from the live image scan to the first feature vector using the generated search scope;
   identifying the GUID corresponding to the first feature vector that matches the second feature vector; and
   outputting information corresponding to the object of the profile identified by the GUID corresponding to the first feature vector.

2. The method of claim 1, further comprising:
   generating a plurality of partitions within the directory; and classifying the generated profile for the object in the directory into one of the generated plurality of partitions.

3. The method of claim 2, wherein:
the generated search scope includes the plurality of partitions, and
the method further comprises searching each partition of the plurality of partitions in parallel for the first feature vector corresponding to the second feature vector.

4. The method of claim 1, further comprising:
updating the first feature vector without calling a training function when the new image data is added to the directory.

5. The method of claim 1, further comprising, to identify the GUID as corresponding to the first feature vector that matches the second feature vector, identifying the generated second feature vector matches the first feature vector corresponding to the GUID.

6. The method of claim 1, further comprising:
generating a second search scope, the second search scope including the GUID corresponding to the profile.

7. The method of claim 1, wherein generating the second feature vector from the live image scan includes executing an object recognition application.

8. The method of claim 1, wherein:
the object is an individual, and
the live image scan is a live facial scan.

9. A system for object data storage, the system comprising:
a processor; and
a computer-readable medium storing instructions that are operative, upon execution by the processor, to cause the processor to:
generate a first feature vector from original image data corresponding to an object,
receive scenario data, the scenario data indicating a quality filter applied to the original image data,
generate a profile for the object in a directory, the profile including the first feature vector corresponding to the object, the scenario data, and a global unique identifier (GUID) corresponding to the first feature vector in the profile,
receive new image data corresponding to the object,
determine whether a new quality filter applied to the new image data matches the quality filter applied to the original image data using the scenario data,
based on determining that the new quality filter matches the quality filter, add the new image data to the profile,
generate a search scope, the search scope including at least the GUID corresponding to the profile,
generate a second feature vector from a live image scan,
match the generated second feature vector from the live image scan to the first feature vector using the generated search scope,
identify the GUID corresponding to the first feature vector that matches the second feature vector, and
output information corresponding to the object of the profile identified by the GUID corresponding to the first feature vector.

10. The system of claim 9, wherein the computer-readable medium further stores instructions that are operative, upon execution by the processor, to cause the processor to:
generate a plurality of partitions within the directory; and
classify the generated profile for the object in the directory into one of the generated plurality of partitions.

11. The system of claim 10, wherein:
the generated search scope includes the plurality of partitions, and
the computer-readable medium further stores instructions that are operative, upon execution by the processor, to cause the processor to search each partition of the plurality of partitions in parallel for the first feature vector corresponding to the second feature vector.

12. The system of claim 9, wherein the computer-readable medium further stores instructions that are operative, upon execution by the processor, to cause the processor to:
update the first feature vector without calling a training function when the new image data is added to the directory.

13. The system of claim 9, wherein the computer-readable medium further stores instructions that are operative, upon execution by the processor, to cause the processor, to identify the GUID as corresponding to the first feature vector that matches the second feature vector, identify the generated second feature vector matches the first feature vector corresponding to the GUID.

14. The system of claim 9, wherein the computer-readable medium further stores instructions that are operative, upon execution by the processor, to cause the processor to:
generate a second search scope, the second search scope including the GUID corresponding to the profile.

15. The system of claim 9, wherein the computer-readable medium further stores instructions that are operative, upon execution by the processor, to cause the processor, to generate the feature vector from the live image scan, to execute an object algorithm application.

16. The system of claim 9, wherein:
the object is an individual, and
the live image scan is a live facial scan.

* * * * *